(12) United States Patent
Sangli et al.

(10) Patent No.: US 12,215,627 B2
(45) Date of Patent: Feb. 4, 2025

(54) SEPARATORS FOR USE WITH GAS TURBINE ENGINES

(71) Applicant: General Electric Company, Schenectady, NY (US)

(72) Inventors: Pradeep Hemant Sangli, Bangalore (IN); Santosh Kumar Potnuru, Bangalore (IN); Keith A. Miedema, Fairfield, OH (US); Matthew D. Brothers, Cincinnati, OH (US); Ravindra Shankar Ganiger, Bangalore (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/295,590

(22) Filed: Apr. 4, 2023

(65) Prior Publication Data
US 2024/0263585 A1    Aug. 8, 2024

(30) Foreign Application Priority Data

Feb. 8, 2023 (IN) ............................. 202311008052

(51) Int. Cl.
*F02C 7/30* (2006.01)
*B64D 13/06* (2006.01)

(52) U.S. Cl.
CPC ........ *F02C 7/30* (2013.01); *B64D 2013/0651* (2013.01); *F05D 2260/607* (2013.01)

(58) Field of Classification Search
CPC ............... F02C 7/30; B64D 2013/0651; F05D 2260/607; F05D 2260/609; F16N 39/002
See application file for complete search history.

(56) References Cited

U.S. PATENT DOCUMENTS

| | | | |
|---|---|---|---|
| 6,033,450 A | 3/2000 | Krul et al. | |
| 7,063,734 B2* | 6/2006 | Latulipe | F01D 25/18 55/428 |
| 7,377,110 B2 | 5/2008 | Sheridan et al. | |
| 8,292,034 B2 | 10/2012 | Mount et al. | |
| 9,540,951 B2 | 1/2017 | Dos Santos et al. | |
| 9,677,424 B2 | 6/2017 | Miller et al. | |
| 10,895,201 B2 | 1/2021 | Beier et al. | |
| 11,181,010 B2 | 11/2021 | Kostka et al. | |
| 2014/0096533 A1 | 4/2014 | Homeyer et al. | |
| 2017/0089262 A1 | 3/2017 | Yokoyama et al. | |
| 2020/0284163 A1* | 9/2020 | Gebhard | B01D 45/14 |

* cited by examiner

*Primary Examiner* — Courtney D Heinle
*Assistant Examiner* — Danielle M. Christensen
(74) *Attorney, Agent, or Firm* — Hanley, Flight & Zimmerman, LLC

(57) ABSTRACT

Separators for use with gas turbine engines are disclosed herein. An example separator disclosed herein includes a first ring including a first surface, a second surface opposite the first surface, and a first opening extending from the first surface to the second surface, a second ring surrounding the first ring, the second ring including a third surface, a fourth surface, and a second opening extending from the first surface to the second surface, and a filter disposed between the first ring and the second ring, the filter disposed in a fluid pathway extending between the first opening and the second opening.

20 Claims, 14 Drawing Sheets

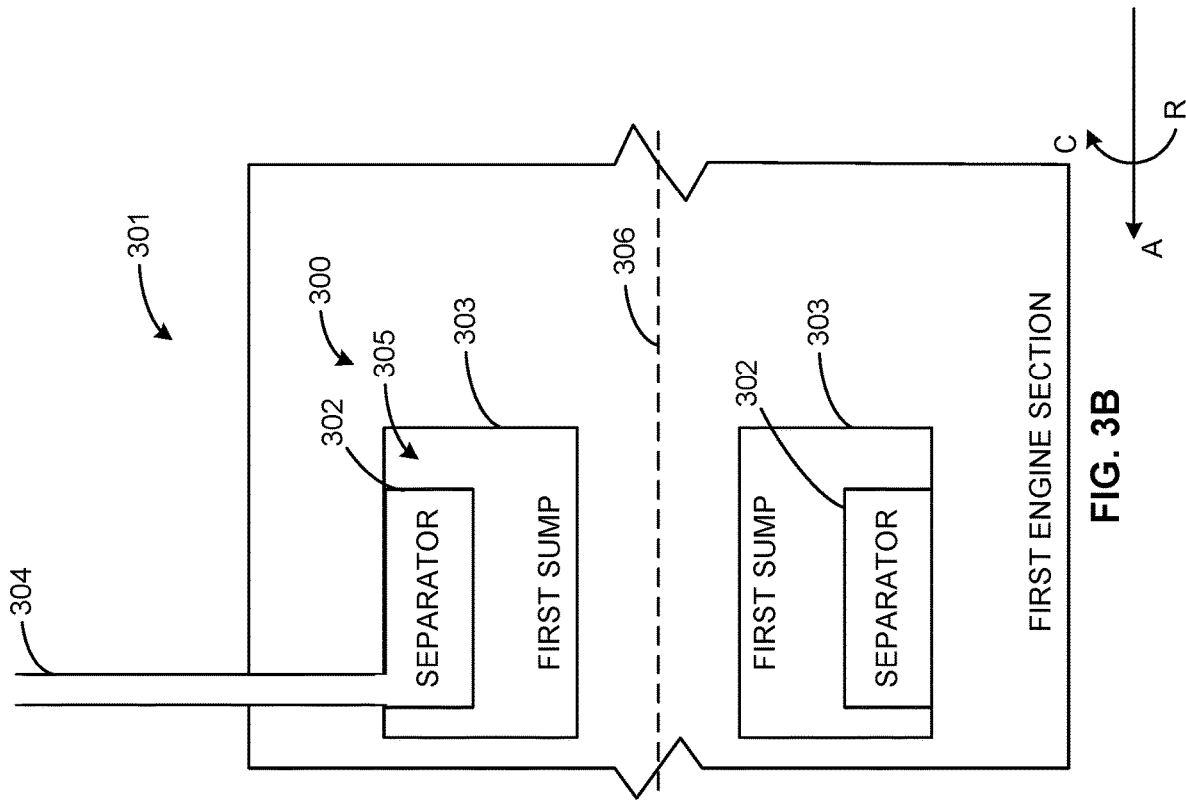
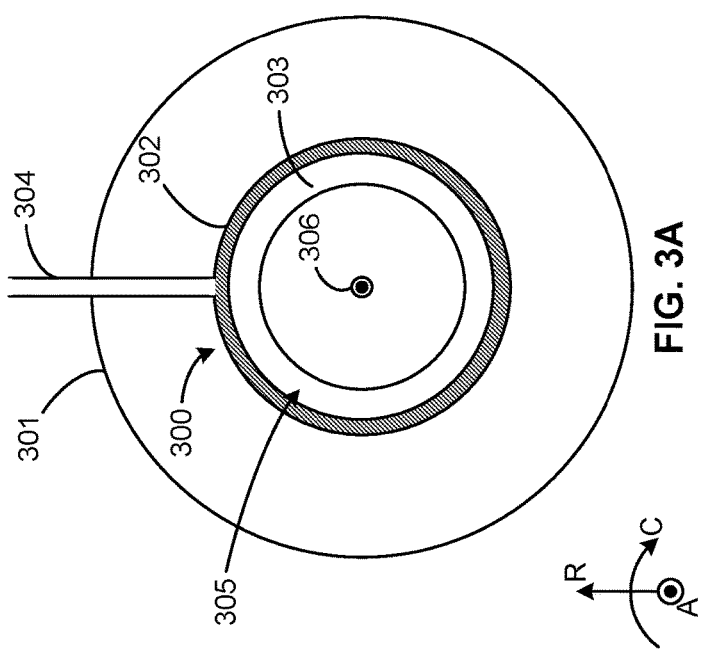
FIG. 3A
FIG. 3B

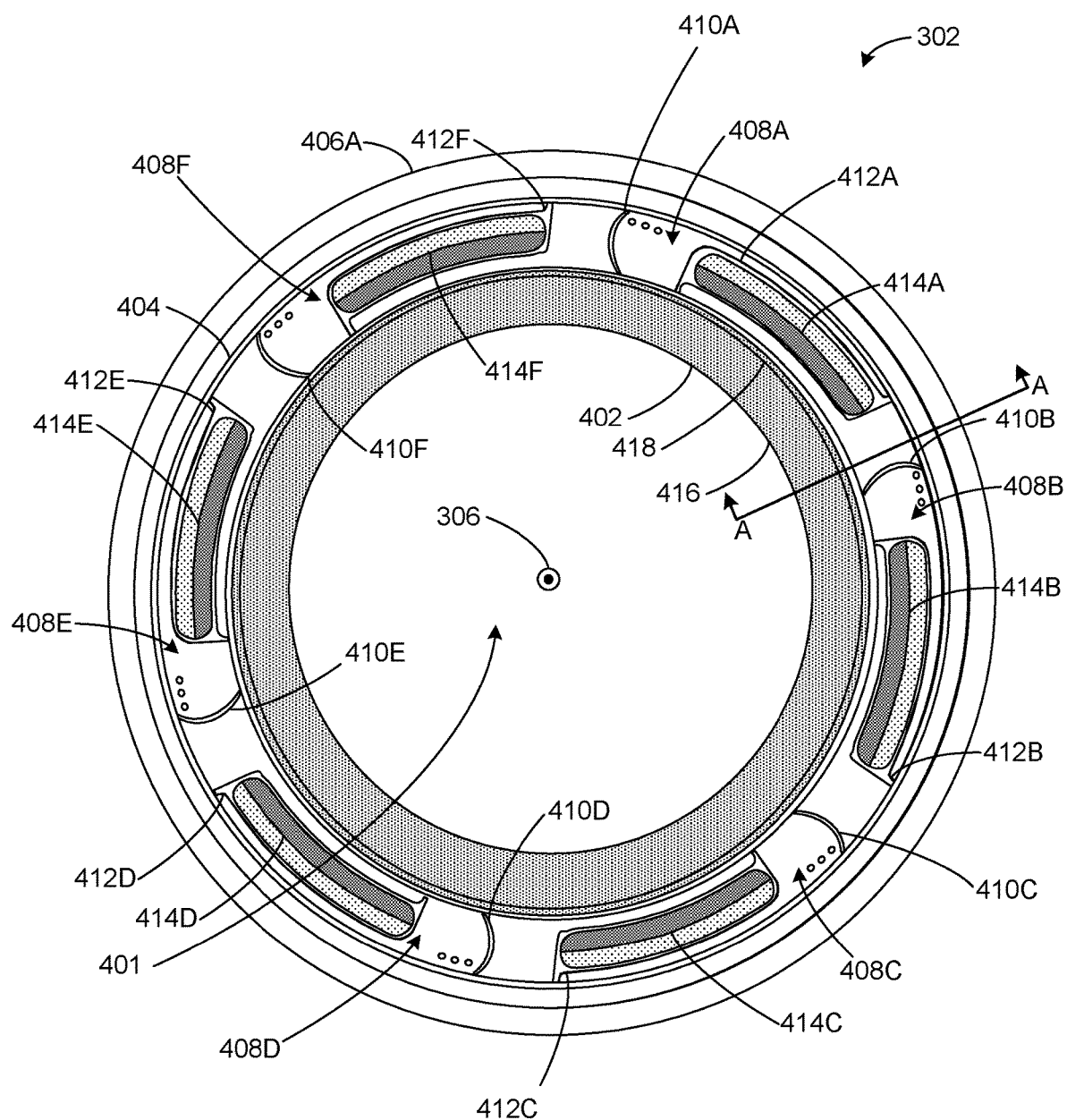
FIG. 4A
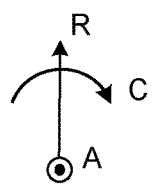

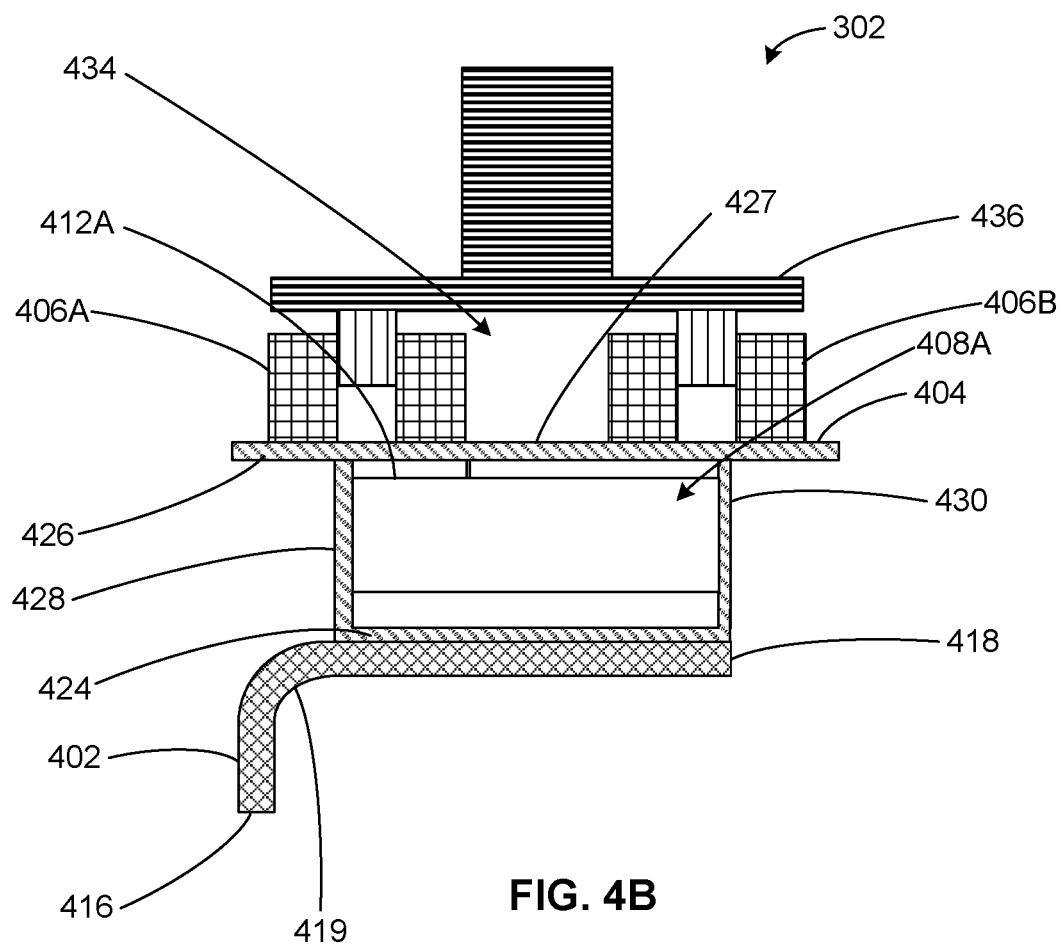
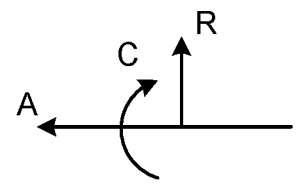
FIG. 4B

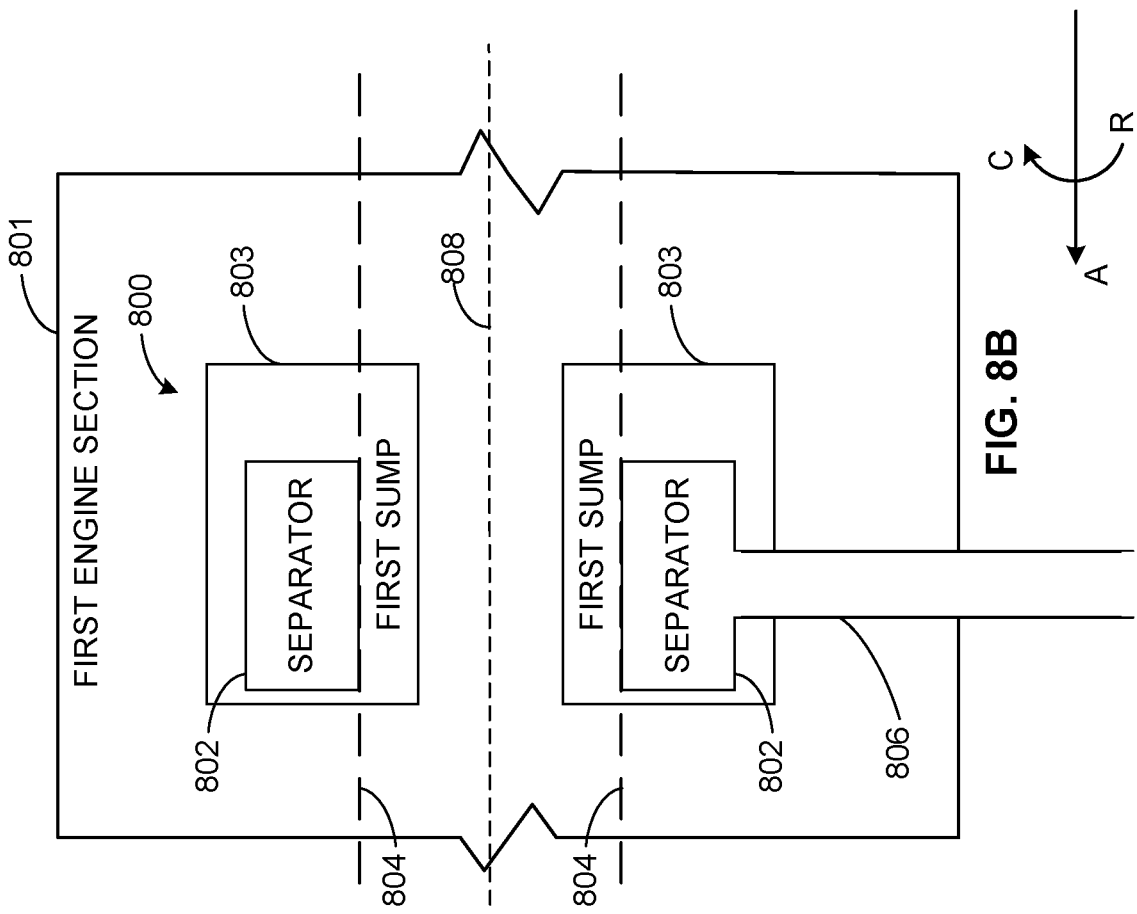
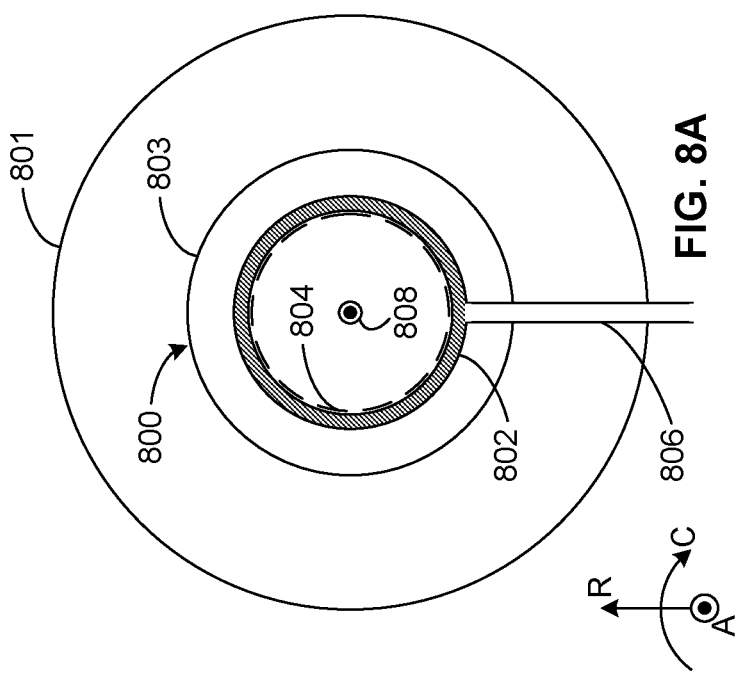

SEPARATORS FOR USE WITH GAS TURBINE ENGINES

RELATED APPLICATION

This patent claims priority to Indian patent application Ser. No. 202311008052, filed on Feb. 8, 2023, which is incorporated herein by reference in its entirety.

FIELD OF THE DISCLOSURE

This disclosure relates generally to gas turbine engines and, more particularly, to separators for use with gas turbine engines.

BACKGROUND

Turbine engines are some of the most widely-used power-generating technologies, often being utilized in aircraft and power-generation applications. A turbine engine generally includes a fan and a core arranged in flow communication with one another. The core of the turbine engine generally includes, in serial flow order, a compressor section, a combustion section, a turbine section on the same shaft as the compressor section, and an exhaust section. Typically, a casing or housing surrounds the core of the turbine engine.

BRIEF DESCRIPTION OF THE DRAWINGS

A full and enabling disclosure of the presently described technology, including the best mode thereof, directed to one of ordinary skill in the art, is set forth in the specification, which makes reference to the appended figures, in which:

FIG. 3A is a schematic rear view of an example sump including a separator implemented in accordance with the teachings of this disclosure.

FIG. 3B is a schematic side view of the example sump of FIG. 3A.

FIGS. 4A-4D are various views of the separator of FIGS. 3A and 3B.

FIG. 8A is a schematic rear view schematic view of another example sump including a separator implemented in accordance with the teachings of this disclosure.

FIG. 8B is a schematic side view of the sump of FIG. 8A.

Figure 1:
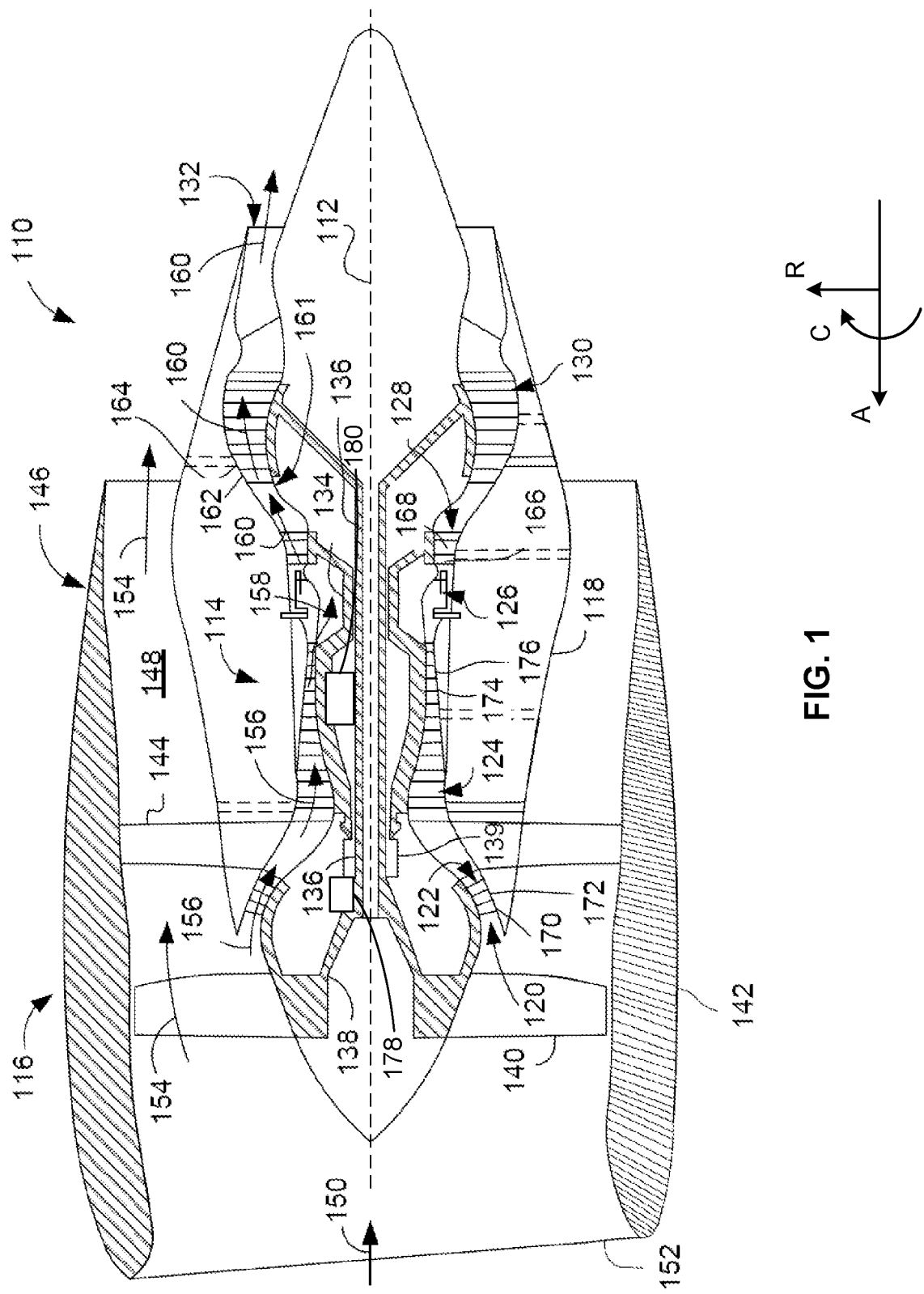
FIG. 1 is a cross-sectional view of a gas turbine engine in which examples disclosed herein may be implemented.

The figures are not to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or as terms, such "about", "approximately", and "substantially", are not to be limited to the precise value specified. In some examples used herein, the term "substantially" is used to describe a relationship between two parts that is within three degrees of the stated relationship (e.g., a substantially colinear relationship is within three degrees of being linear, a substantially perpendicular relationship is within three degrees of being perpendicular, a substantially parallel relationship is within three degrees of being parallel, a substantially flush relationship is within three degrees of being flush, etc.).

The terms "upstream" and "downstream" refer to the relative direction with respect to fluid flow in a fluid pathway. For example, "upstream" refers to the direction from which the fluid flows, and "downstream" refers to the direction to which the fluid flows. The terms "inboard" and "outboard" refer to the relative direction with respect to a center of an engine. For example, "inboard" refers to the direction towards the engine centerline, and "outstream" refers to the direction away from the engine centerline. Various terms are used herein to describe the orientation of features. In general, the attached figures are annotated with a set of axes including the axial axis A, the circumferential axis C, and the radial axis R.

The terms "hole" and "opening" are used interchangeable to refer to apertures in a structure. However, different instances of these terms should not be taken to limit the scope of the subject matter described therewith. Instead, the terms are used for clarity and/or descriptive purposes only.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

DETAILED DESCRIPTION

During the operation of gas turbine engines, engine systems use oil for lubrication and cooling. As gas turbine engines have increased in operational speed, the oil demands of these engines have similarly increased. Air can become trapped in this oil, which is to be separated therefrom to help ensure the continued operation of the engine. Example air-oil separators disclosed herein offer increased separation efficiency and lower weight when compared to prior air-oil separators. Example separators disclosed herein are disposed within the sumps of gas turbine engines and use the rotational kinetic energy of the sumps to efficiently separate air and oil. Some example sumps disclosed herein include fuel-oil separation capability, which allows the separation of fuel and oil in the sump in the event of a fuel-in-oil event. Other examples disclosed herein include separators that separate supercritical liquids from supercritical gas on gas turbine engine thermal management systems to prevent damage to the thermal management system. Other examples disclosed herein include separators that separate particulate matter, like smoke, from bleed air of bleed lines.

A turbine engine, also referred to herein as a gas turbine engine, is a type of internal combustion engine that uses atmospheric air as a moving fluid. In operation, atmospheric air enters the turbine engine via a fan and flows through a compressor section in which one or more compressors progressively compresses (e.g., pressurizes) the air until it reaches the combustion section. In the combustion section, the pressurized air is combined with fuel and ignited to produce a high-temperature, high-pressure gas stream (e.g., hot combustion gas) before entering the turbine section. The hot combustion gases expand as they flow through a turbine section, causing the blades of one or more turbines to spin. The rotating blades of the turbine produce a spool work output that powers a corresponding compressor. The spool is a combination of the compressor, a shaft, and the turbine. Turbine engines often include a plurality of spools, such as a high-pressure spool (e.g., HP compressor, shaft, and turbine) and a low-pressure spool (e.g., LP compressor, shaft, and turbine). A turbine engine can include one spool or more than two spools in additional or alternative examples.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B. As used herein, various features are following with a parenthetical "e.g.," which when used in a form such as A (e.g., B, C, etc.) indicates that A may be implemented by (1) B, (2) C, (3) B and C, or (4) something that is neither B nor C. It should be appreciated that such parentheticals and other uses of the term "example" are non-limiting examples.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Engine sump systems contain the oil used to lubricant and cool gas turbine engine components, such as the bearings used to support the spools of the gas turbine engine. In recent years, the shaft speed of engines has increased, leading to larger oil requirements of the gas turbine engine. During operation, air and oil mix in the engine sump system. To help ensure the continued operation of the engine and to conserve oil, this air should be separated from the oil. Some prior systems for the separation of air from the oil in the sump include vent lines that run from the sump to a separator coupled to an accessory gearbox (AGB) of the gas turbine engine. Such prior separation systems often have a comparatively high weight and large pressure drops, due to the long vent lines from the sump to the AGB, and a comparatively low separation efficiency, due to the low rotational kinetic energy of the AGB.

Example air-oil separators disclosed herein overcome the above-noted deficiencies and offer increased separation efficiency and lower weight when compared to prior air-oil separators. The increased separation efficiency of the separators disclosed herein reduces oil losses from engine, which lowers the amount of required replacement oil and the required frequency of oil servicing. The separators disclosed herein are disposed within the sump(s) of the gas turbine engine, which mitigates the need for lines from the sump containing the air/oil mixture to be separated, reducing the comparative weight of the engine. Examples disclosed herein include separators disposed within a rotating portion of the sump, which allows the separator to utilize the comparatively greater rotational kinetic energy of the shaft (e.g., relative to the AGB, etc.) to separate air and oil. Some examples disclosed herein include separators that separate supercritical fluids from supercritical gaseous from gas turbine engine thermal management systems to prevent damage to the thermal management system. Other examples disclosed herein include separators that separate particulate matter, like smoke, from bleed air of the customer bleed lines.

Referring now to the drawings, wherein identical numerals indicate the same elements throughout the figures, FIG. 1 is a schematic cross-sectional view of an example high-bypass turbofan-type gas turbine engine 110 ("turbofan engine 110"). While the illustrated example is a high-bypass turbofan engine, the principles of the present disclosure are also applicable to other types of engines, such as low-bypass turbofans, turbojets, turboprops, propfans, etc. As shown in FIG. 1, the turbofan engine 110 defines a longitudinal or axial centerline axis 112 extending therethrough for reference. FIG. 1 also includes an annotated directional diagram with reference to an axial direction A, a circumferential direction C, and a radial direction R.

In general, the turbofan engine 110 includes a core turbine or gas turbine engine 114 disposed downstream from a fan section 116. The core turbine 114 includes a substantially tubular outer casing 118 that defines an annular inlet 120. The outer casing 118 can be formed from a single casing or multiple casings. The outer casing 118 encloses, in serial flow relationship, a compressor section having a booster or low-pressure compressor 122 ("LP compressor 122") and a high pressure compressor 124 ("HP compressor 124"), a combustion section 126, a turbine section having a high pressure turbine 128 ("HP turbine 128") and a low-pressure turbine 130 ("LP turbine 130"), and an exhaust section 132. A high pressure shaft or spool 134 ("HP shaft 134") drivingly couples the HP turbine 128 and the HP compressor 124. A low-pressure shaft or spool 136 ("LP shaft 136") drivingly couples the LP turbine 130 and the LP compressor 122. The LP shaft 136 can also couple to a fan spool or shaft 138 of the fan section 116. In some examples, the LP shaft 136 is coupled directly to the fan shaft 138 (e.g., a direct-drive configuration). In alternative configurations, the LP shaft 136 can couple to the fan shaft 138 via a reduction gear 139 (e.g., an indirect-drive or geared-drive configuration).

As shown in FIG. 1, the fan section 116 includes a plurality of fan blades 140 coupled to and extending radially outwardly from the fan shaft 138. An annular fan casing or nacelle 142 circumferentially encloses the fan section 116 and/or at least a portion of the core turbine 114. The nacelle 142 can be supported relative (e.g., partially supported, etc.) to the core turbine 114 by a plurality of circumferentially-spaced apart outlet guide vanes 144. Furthermore, a downstream section 146 of the nacelle 142 can enclose an outer portion of the core turbine 114 to define a bypass airflow passage 148 therebetween.

As illustrated in FIG. 1, air 150 enters an inlet portion 152 of the turbofan engine 110 during operation thereof. A first portion 154 of the air 150 flows into the bypass airflow passage 148, while a second portion 156 of the air 150 flows into the inlet 120 of the LP compressor 122. One or more sequential stages of LP compressor stator vanes 170 and LP compressor rotor blades 172 coupled to the LP shaft 136 progressively compress the second portion 156 of the air 150 flowing through the LP compressor 122 en route to the HP compressor 124. Next, one or more sequential stages of HP compressor stator vanes 174 and HP compressor rotor blades 176 coupled to the HP shaft 134 further compress the second portion 156 of the air 150 flowing through the HP compressor 124. This provides compressed air 158 to the combustion section 126 where it mixes with fuel and burns to provide combustion gases 160.

The combustion gases 160 flow through the HP turbine 128 where one or more sequential stages of HP turbine stator vanes 166 and HP turbine rotor blades 168 coupled to the HP shaft 134 extract a first portion of kinetic and/or thermal energy therefrom. This energy extraction supports operation of the HP compressor 124. The combustion gases 160 then flow through the LP turbine 130 where one or more sequential stages of LP turbine stator vanes 162 and LP turbine rotor blades 164 coupled to the LP shaft 136 extract a second portion of thermal and/or kinetic energy therefrom. This energy extraction causes the LP shaft 136 to rotate, thereby supporting operation of the LP compressor 122 and/or rotation of the fan shaft 138. The combustion gases 160 then exit the core turbine 114 through the exhaust section 132 thereof. A turbine frame 161 with a fairing assembly is located between the HP turbine 128 and the LP turbine 130. The turbine frame 161 acts as a supporting structure, connecting a high-pressure shaft's rear bearing with the turbine housing and forming an aerodynamic transition duct between the HP turbine 128 and the LP turbine 130. Fairings form a fluid pathway between the high-pressure and low-pressure turbines and can be formed using metallic castings (e.g., nickel-based cast metallic alloys, etc.).

Along with the turbofan engine 110, the core turbine 114 serves a similar purpose and is exposed to a similar environment in land-based gas turbines, turbojet engines in which the ratio of the first portion 154 of the air 150 to the second portion 156 of the air 150 is less than that of a turbofan, and unducted fan engines in which the fan section 116 is devoid of the nacelle 142. In each of the turbofan, turbojet, and unducted engines, a speed reduction device (e.g., the reduction gear 139) can be included between any shafts and spools. For example, the reduction gear 139 is disposed between the LP shaft 136 and the fan shaft 138 of the fan section 116.

As described above with respect to FIG. 1, the turbine frame 161 is located between the HP turbine 128 and the LP turbine 130 to connect the high-pressure shaft's rear bearing with the turbine housing and form an aerodynamic transition duct between the HP turbine 128 and the LP turbine 130. As such, air flows through the turbine frame 161 between the HP turbine 128 and the LP turbine 130.

In FIG. 1, the gas turbine engine 110 includes a first sump 178 and a second sump 180, which include cavities that contain oil. The oil of the first sump 178 and the second sump 180 lubricate and cool the components of the gas turbine engine, including the bearings and rotating components associated with the HP shaft 134, the LP shaft 136 and the fan shaft 138. In FIG. 1, the first sump 178 is associated with the fan shaft 138 and the second sump 180 is disposed in the LP shaft 136. It should be appreciated that the gas turbine engine 110 can include sumps in addition to the first sump and the second sump (e.g., one or more sumps other sumps associated with the LP shaft 136, one or more other sumps associated with the fan shaft 138, one or more sumps HP shaft 134, etc.).

Figure 2:
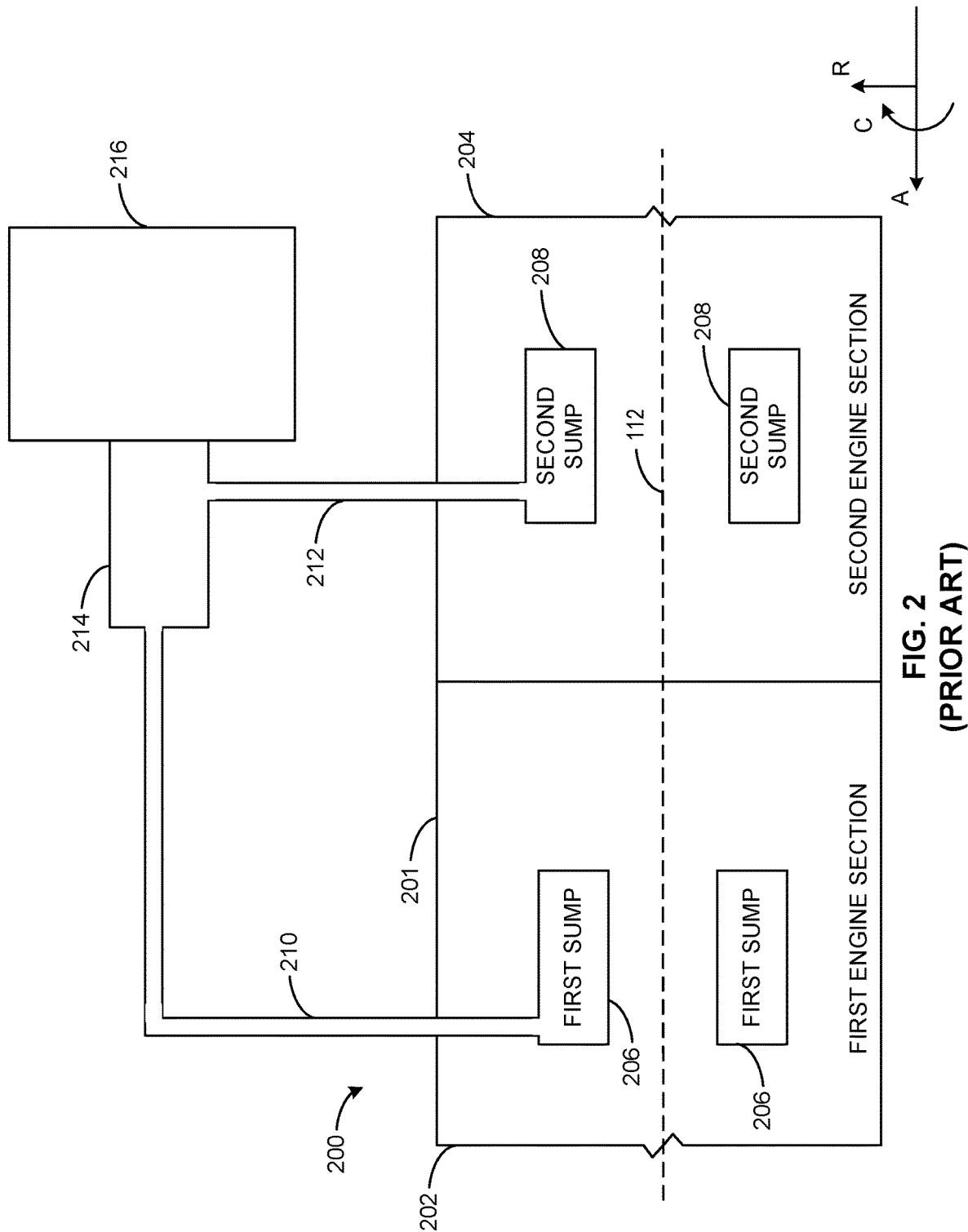
FIG. 2 is a schematic view of a prior sump and vent arrangement.

FIG. 2 is a schematic view of a prior sump system 200 that can be used in conjunction with a gas turbine engine 201, similar to the gas turbine engine 110 of FIG. 1. In FIG. 2, the gas turbine engine 201 includes a first engine section 202 and a second engine section 204. In FIG. 2, the sump system 200 includes a first sump 206 (e.g., a sump associated with a fan shaft of the gas turbine engine 201, etc.) partly disposed in the first engine section 202 and a second sump 208 (e.g., a sump associated with a compressor section of the gas turbine engine 201, a sump associated a turbine section of the gas turbine engine 201, etc.) disposed in the second engine section 204. The first sump 206 and the second sump 208 are coupled to a first vent line 210 and a second vent line 212, respectively, which are coupled to a separator 214. After leaving the separator 214, the separator 214 is coupled to an AGB 216.

The first sump 206 and the second sump 208 are enclosed at least partly within the first engine section 202 and the second engine section 204, respectively. The first sump 206 and second sump 208 contain oil for use of lubrication, cooling of components of the gas turbine engine 201, or a combination thereof. The first sump 206 and the second sump 208 can provide lubrication, cooling, or a combination thereof to the bearings that mount the shafts of the gas turbine engine 201 (e.g., the HP shaft 134 of FIG. 1, the LP shaft 136 of FIG. 1, the fan shaft 138 of FIG. 1, etc.). The first sump 206 and the second sump 208 includes seals that maintain a pressure differential between the first sump 206 and the second sump 208 and the first engine section 202 and the second engine section 204 to prevent oil from leaking therefrom. This pressure differential can cause air to flow into first sump 206 and the second sump 208 and mix with the oil therein. The first vent line 210 and the second vent line 212 maintain this pressure differential by venting air from the first sump 206 and the second sump 208, respectively.

The AGB 216 is a mechanical drive that provides power to auxiliary components of the gas turbine engine 201. The AGB 216 can receive power from the turbine of the gas turbine engine 201. The AGB 216 can include a provide gears, shafts, and/or other components to produce the mechanical work to power the other components of the gas turbine engine 201. The AGB 216 can provide power for the fuel pump(s), oil pump(s), air compressor(s), generators, etc. In FIG. 2, the AGB 216 is not disposed within the core of the gas turbine engine 201. In FIG. 2, the separator 214 is coupled and powered by the AGB 216. For example, the separator 214 can be implemented by a force vortex separator that uses rotational work provided by the AGB 216 to separate air and oil via centrifugal action. The first vent line 210 and the second vent line 212 run from the first sump 206 and the second sump 208 to the AGB 216, which is typically a comparatively long distance. The long length of the first vent line 210 and the second vent line 212 increases the weight of the gas turbine engine 201 and results in a large pressure drop over the length of the first vent line 210 and the second vent line 212. Additionally, the efficiency of the prior separator 214 depends on the rotational kinetic energy supplied by the AGB 216. As such, the efficiency of the prior separator 214 is limited by the output of the AGB 216 (e.g., typically 20% of the rotational energy of the shaft, etc.).

Examples are disclosed below in conjunction with FIGS. 3A-10 that can be used in conjunction with the examples of FIGS. 1 and 2. As such, the same reference numbers that are used for the structures shown in FIGS. 1 and 2 are used for similar or identical structures in FIGS. 3A-10. Further, details of the parts are not repeated in connection with FIGS. 3A-10.

FIGS. 3A and 3B are a rear schematic view and a side schematic view, respectively, of an example sump system 300 of an example gas turbine engine 301 including an example separator 302 implemented in accordance with the teachings of this disclosure. In the illustrated example of FIGS. 3A and 3B, the sump system 300 includes an example sump 303 and an example vent line 304. In some examples,
the sump 303 of the sump system 300 can implement the first sump 178 of FIG. 1. In other examples, the sump 303 can implement the second sump 180 of FIG. 1. In some examples, the sump system 300 can include additional sumps (not illustrated) which include corresponding separators implemented in accordance with the teachings of this disclosure. The features of the sump system 300 are described below with simultaneous reference to the FIGS. 3A-3B.

The separator 302 is a mechanical structure (e.g., a mechanical component, a mechanical assembly, etc.) that separates gas (e.g., air, other gases, etc.) from the oil in the sump 303. In the illustrated example of FIGS. 3A and 3B, the separator 302 is a cylindrical component that extends circumferentially around an example centerline 306 of the gas turbine engine 301. Unlike the separator 214 of FIG. 2, the separator 302 of FIGS. 3A and 3B is disposed within a cavity 305 of the sump 303. For example, the separator 302 can be disposed in an isolated and rotating portion of the sump 303 (e.g., not adjacent to any bearings of the sump 303, a quiet zone of the sump, etc.). As used herein, "a quiet zone" of a sump refers to a portion of the sump distal to the bearing of the sump (e.g., a bearing associated with the HP shaft 134 of FIG. 1, a bearing associated with the LP shaft 136 of FIG. 1, a bearing associated with the fan shaft 138 of FIG. 1, etc.). The fluid disposed in sump quiet zones is typically composed of a comparatively greater portion of air and is turbulent. As such, the fluid in sump quiet zones is more efficiently separated. In other examples, the separator 302 can be disposed within any other rotating portion of the sump 303. In some such examples, rotation of the sump 303 drives oil and air into the separator 302. In some such examples, the separator 302 separates the air and the oil, returning the oil to the cavity 305 of the sump 303 and venting the air via the vent line 304. In some examples, due the comparatively higher kinetic energy of the rotating components of the gas turbine engine 301 (e.g., the shafts 134, 136, 138, etc.) compared to the AGB 216 of FIG. 2, the separator 302 is able to separate air and oil at a greater efficiency than the separator 214 of FIG. 2. An example implementation of the separator 302 is described in greater detail below in conjunction with FIGS. 4A-4D.

The separator 302 can include one or more filters (e.g., a plurality of filters, etc.) that are configured to separate liquid oil and gas (e.g., air, etc.). As used herein, a filter refers to any structure that is configured to separate multiple substances from each other. For example, an individual filter can include one or more separation medium(s). As used herein, a separation medium is a material (e.g., a selectively permeable material, a porous material, a fibrous material, etc.) that permits some substances to flow therethrough and prevents other substances from flowing therethrough. Example separation mediums include fiberglass, activated carbon, foam, natural fibers (e.g., cotton, etc.), a metal mesh/sponge, a polymer mesh, etc. Additionally or alternatively, a filter can include one or more geometric structure(s) that similarly separate multiple substances from each other. Example filter configurations that can be used with the separator 302 are described below in conjunction with FIGS. 5 and 6.

In some examples, the vent line 304 feeds to a through-frame of the gas turbine engine 301. Additionally or alternatively, the vent line 304 can feed directly to the ambient atmosphere (e.g., the sump is in a cooler section of the engine, etc.) and/or into a bypass fluid pathway of the gas turbine engine 301. For example, the vent line 304 can extend directly through a non-rotating portion of the gas turbine engine (e.g., a stator portion, etc.) directly to an outboard location of the gas turbine engine 301. In other examples, the vent line 304 can extend into another portion of the gas turbine engine 301. While one vent line (e.g., the vent line 304, etc.) is depicted in FIGS. 3A and 3B, in other examples, the sump system 300 can include any additional number of vent line 304. The separator 302 can be used in any other sump system, including the second sump 180 of FIG. 1.

Figure 4C:
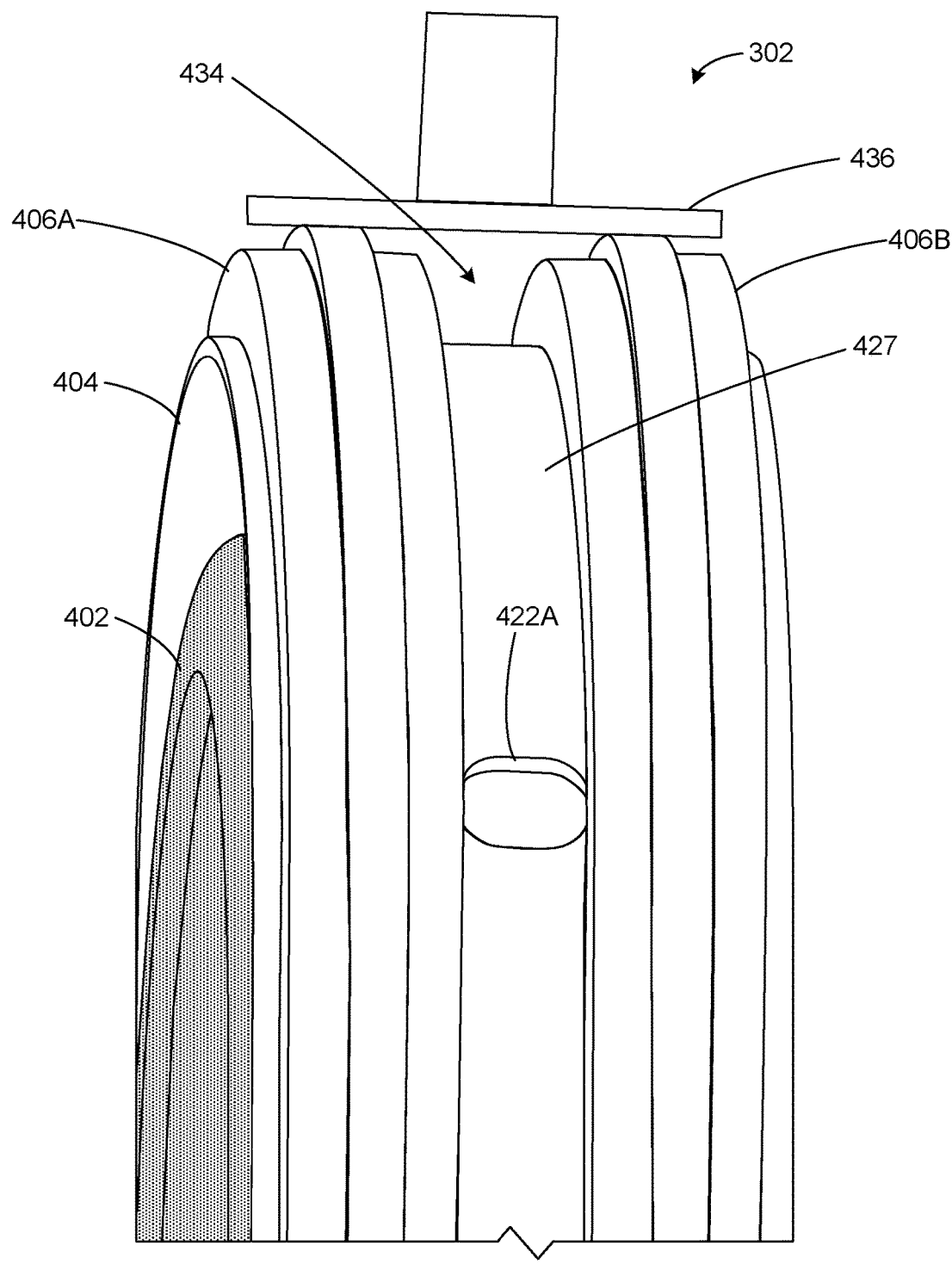
Figure 4D:
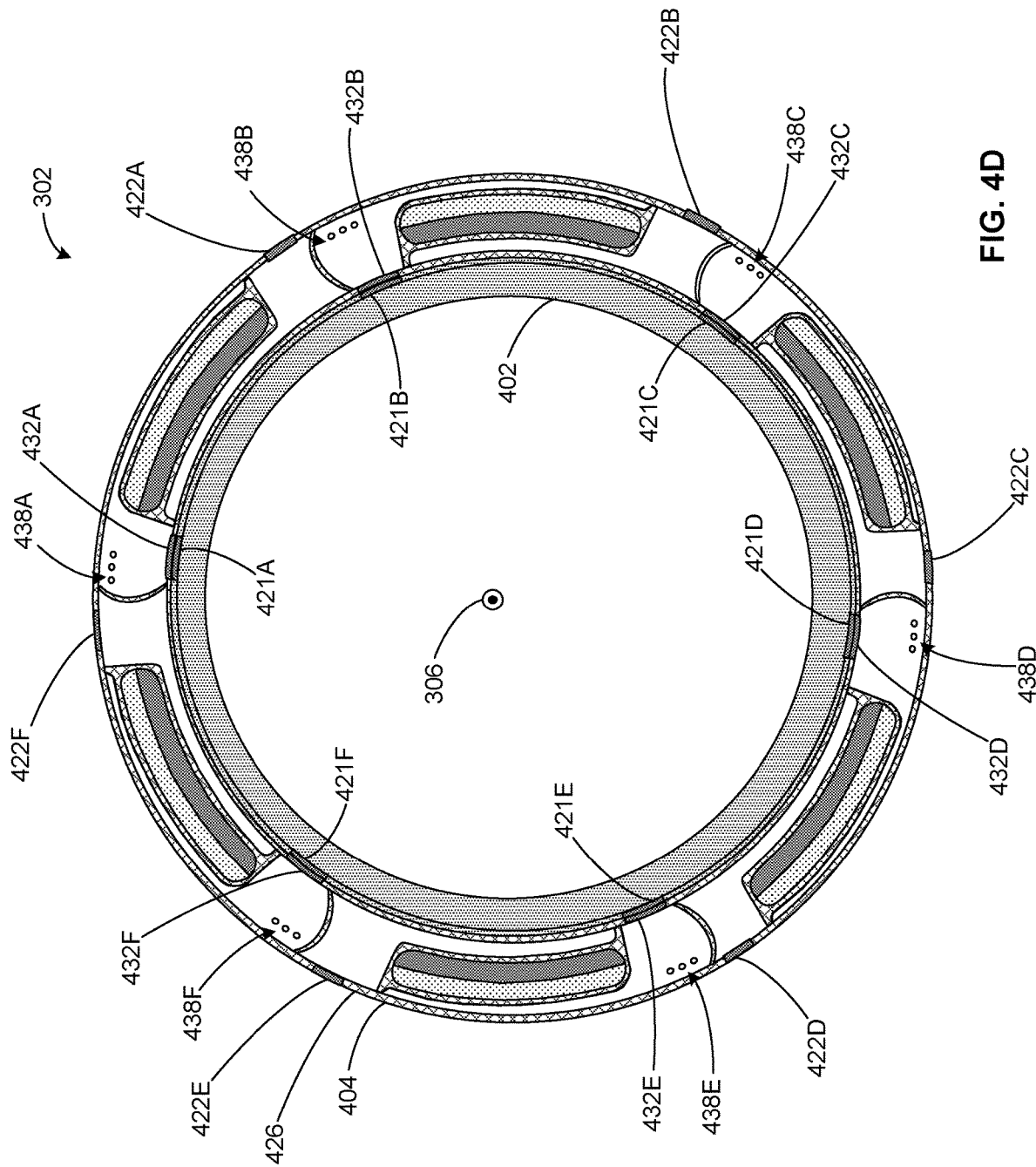

FIG. 4A is a front view of the separator 302 that is disposed about the centerline 306 of FIGS. 3A and 3B and encompasses an example cavity 401 associated with the cavity 305 of FIGS. 3A and 3B. FIG. 4B is cross-sectional side view of a portion of the separator 302 taken along the line A-A of FIG. 4A. FIG. 4C is a perspective side view of the separator 302. FIG. 4D is a cross-sectional front view of separator 302, along a plane that bisects the separator 302 and parallel to the front view of FIG. 4A. The features of the separator 302 are described below with simultaneous reference to the FIGS. 4A-4D as appropriate based on the visibility of the features in the corresponding one(s) of the FIGS. 4A-4D.

In the illustrated examples of FIGS. 4A-4D, the separator 302 includes a first ring 402 (e.g., an inner ring, etc.), a second ring 404 (e.g., an outer ring, etc.), a first piston seal 406A, and a second piston seal 406B. In the illustrated example of FIG. 4A, the second ring 404 includes a first interior section 408A, a second interior section 408B, a third interior section 408C, a fourth interior section 408D, a fifth interior section 408E, and a sixth interior section 408F. In the illustrated examples of FIGS. 4A and 4D, the first interior section 408A, the second interior section 408B, the third interior section 408C, the fourth interior section 408D, the fifth interior section 408E and the sixth interior section 408F are defined by a first internal wall 410A, a second internal wall 410B. a third internal wall 410C, a fourth internal wall 410D, a fifth internal wall 410E, a sixth internal wall 410F, respectively, which are disposed within the second ring 404. In the illustrated examples of FIGS. 4A and 4D, the first interior section 408A, the second interior section 408B, the third interior section 408C, the fourth interior section 408D, the fifth interior section 408E and the sixth interior section 408F include a first filter mount 412A, a second filter mount 412B, a third filter mount 412C, a fourth filter mount 412D, a fifth filter mount 412E, and a sixth filter mount 412F, respectively, which include a first filter 414A, a second filter 414B, a third filter 414C, a fourth filter 414D, a fifth filter 414E, and a sixth filter 414F, respectively.

In the illustrated examples of FIGS. 4A-4D, the first ring 402 includes a lip portion 416 and an annular portion 418. In the illustrated example of FIG. 4A, the lip portion 416 extends radially inward from the annular portion 418. In the illustrated example of FIG. 4B, the lip portion 416 is separated from the annular portion 418 via a transition portion 419. In the illustrated example of FIG. 4B, the transition portion 419 includes a fillet. In other examples, the transition portion 419 can include a chamfer or a bevel. In the illustrated example of FIG. 4B, the annular portion 418 is an open cylinder that includes an inboard surface 420A that faces the cavity 401 and an example outboard surface 420B that abuts the second ring 404. In some examples, the annular portion 418 of the first ring 402 is coupled to the second ring 404 (e.g., via a weld, via a fastener, etc.). In the illustrated examples of FIGS. 4A and 4D, the annular portion 418 has a constant thickness across the first ring 402 (e.g., the inboard surface 420A is a constant distance from the outboard surface 420B, etc.). In other examples, the annular portion 418 can have a thickness that varies circumferentially about the centerline 306.

The first ring 402 is disposed around the cavity 401 (e.g., a portion of the cavity 305 of the sump 303 of FIGS. 3A and 3B, etc.) and is in fluid communication therewith. In some examples, the lip portion 416 can include one or more features (e.g., weld locations, holes, etc.) that permit the first ring 402 to be coupled around the cavity 401 and/or to the sump 303. In other examples, the separator 302 can be coupled around the cavity 401 and/or to the sump 303 by a feature of the second ring 404, a feature of the first piston seal 406A and the second piston seal 406B, etc. In some such examples, the lip portion 416 can be coupled to a corresponding aft and/or forward component via a weld.

The first ring 402 can be composed of any material (e.g., steel, titanium, aluminum, a nickel-alloy, etc.) that is appropriate for the ambient temperature of the separator 302 and/or the mechanical stress associated with the rotation of the separator 302. The first ring 402 can be manufactured via negative manufacturing (e.g., machining, casting, drawing, forming, extrusion, punching, etc.), additive manufacturing, and/or a combination thereof. In the illustrated examples of FIGS. 4A-4D, the first ring 402 is depicted as an integral component. In other examples, the first ring 402 can be composed of two or more discrete portions (e.g., a discrete lip portion 416 coupled to a discrete annular portion 418, etc.). In some such examples, each of the components of the first ring 402 can be joined to adjacent ones of the components and/or to the second ring 404.

In the illustrated example of FIG. 4D, the annular portion 418 of the first ring 402 includes a first inboard opening 421A, a second inboard opening 421B, a third inboard opening 421C, a fourth inboard opening 421D, a fifth inboard opening 421E, and a sixth inboard opening 421F. In the illustrated example of FIGS. 4D, the first inboard opening 421A opens in the first interior section 408A of the second ring 404, the second inboard opening 421B opens in the second interior section 408B of the second ring 404, the third inboard opening 421C opens in the third interior section 408C of the second ring 404, the fourth inboard opening 421D opens in the fourth interior section 408D of the second ring 404, the fifth inboard opening 421E opens in the fifth interior section 408E of the second ring 404, and the sixth inboard opening 421F opens in the sixth interior section 408F of the second ring 404. The first inboard opening 421A, the second inboard opening 421B, the third inboard opening 421C, the fourth inboard opening 421D, the fifth inboard opening 421E, and the sixth inboard opening 421F permit fluid(s) to flow into and out of the cavity 401 from the first interior section 408A, the second interior section 408B, the third interior section 408C, the fourth interior section 408D, the fifth interior section 408E, and the sixth interior section 408F. In the illustrated example of FIG. 4D, the first inboard opening 421A, the second inboard opening 421B, the third inboard opening 421C, the fourth inboard opening 421D, the fifth inboard opening 421E, and the sixth inboard opening 421F are generally stadium-shaped (e.g., pill-shaped, disco-rectangular, squoval, etc.). In other examples, the first inboard opening 421A, the second inboard opening 421B, the third inboard opening 421C, the fourth inboard opening 421D, the fifth inboard opening 421E, and the sixth inboard opening 421F can have any other shape (e.g., polygonal, oval-shaped, circular, etc.). In other examples, some or all of the first inboard opening 421A, the second inboard opening 421B, the third inboard opening 421C, the fourth inboard opening 421D, the fifth inboard opening 421E, and the sixth inboard 421F can be composed of multiple openings (e.g., each of the first interior section 408A, the second interior section 408B, the third interior section 408C, the fourth interior section 408D, the fifth interior section 408E, and the sixth interior section 408F, etc., can be in fluid communication with the cavity 401 via multiple holes, etc.).

In the illustrated example of FIG. 4B, the example second ring 404 includes an inner annular portion 424 (e.g., a first annular portion, etc.), an outer annular portion 426 (e.g., a second cylindrical portion, etc.), a first wall 428 (not illustrated in FIG. 4A), and a second wall 430. The second ring 404 is disposed outboard of and around the first ring 402. In the illustrated example of FIG. 4A, the first internal wall 410A, the second internal wall 410B. the third internal wall 410C, the fourth internal wall 410D, the fifth internal wall 410E, and the sixth internal wall 410F divide the interior of the second ring 404 into the plurality of the first interior section 408A, the second interior section 408B, the third interior section 408C, the fourth interior section 408D, the fifth interior section 408E, and the sixth interior section 408F. For example, the first internal wall 410A, the second internal wall 410B. the third internal wall 410C, the fourth internal wall 410D, the fifth internal wall 410E, and the sixth internal wall 410F prevent fluids from flowing between in adjacent ones of the first interior section 408A, the second interior section 408B, the third interior section 408C, the fourth interior section 408D, the fifth interior section 408E, and the sixth interior section 408F. In other examples, the first internal wall 410A, the second internal wall 410B. the third internal wall 410C, the fourth internal wall 410D, the fifth internal wall 410E, and the sixth internal wall 410F can be permeable to the fluid to be expelled from the separator 302.

In the illustrated examples of FIGS. 4A and 4D, each of the first internal wall 410A, the second internal wall 410B, the third internal wall 410C, the fourth internal wall 410D, the fifth internal wall 410E, the sixth internal wall 410F have a curved profile (e.g., an arced profile, a convex profile, a concave profile, a non-straight profile, etc.) with a same curvature in the radial-circumferential plane. In other examples, the first internal wall 410A, the second internal wall 410B. the third internal wall 410C, the fourth internal wall 410D, the fifth internal wall 410E, and the sixth internal wall 410F can have any other suitable profile (e.g., a straight profile, multiple arcs, composed of multiple linear portions, etc.) in the radial circumferential plane. Additionally or alternatively, some or all of the first internal wall 410A, the second internal wall 410B. the third internal wall 410C, the fourth internal wall 410D, the fifth internal wall 410E, and the sixth internal wall 410F can have different profiles in the radial-circumferential plane. In the illustrated examples of FIGS. 4A and 4D, the first internal wall 410A, the second internal wall 410B. the third internal wall 410C, the fourth internal wall 410D, the fifth internal wall 410E, and the sixth internal wall 410F have a flat profile in the axial-circumferential plane. In other examples, the first internal wall 410A, the second internal wall 410B. the third internal wall 410C, the fourth internal wall 410D, the fifth internal wall 410E, and the sixth internal wall 410F can have any other suitable profile in the axial-circumferential plane. While the first internal wall 410A, the second internal wall 410B. the third internal wall 410C, the fourth internal wall 410D, the fifth internal wall 410E, and the sixth internal wall 410F have all been illustrated as having a same profile, size, or shape, it will be understood that this need not be the case.

The first internal wall 410A, the second internal wall 410B. the third internal wall 410C, the fourth internal wall 410D, the fifth internal wall 410E, and the sixth internal wall 410F can be formed via any manufacturing method (e.g., casting, machining, sheet forming, additive manufacturing, molding, etc.) and separately coupled within the interior of the second ring 404 (e.g., via one or more press fit(s), via one or more shrink fit(s), via one or more weld(s), via one or more fastener(s), etc.). In some such examples, the interior of the second ring 404 can include features (e.g., bolt holes, weld locations, slots, etc.) to receive the first internal wall 410A, the second internal wall 410B. the third internal wall 410C, the fourth internal wall 410D, the fifth internal wall 410E, and the sixth internal wall 410F. In other examples, the first internal wall 410A, the second internal wall 410B. the third internal wall 410C, the fourth internal wall 410D, the fifth internal wall 410E, and the sixth internal wall 410F can be formed integrally with the second ring 404 (e.g., via casting, via additive manufacturing, etc.). In some examples, the first internal wall 410A, the second internal wall 410B. the third internal wall 410C, the fourth internal wall 410D, the fifth internal wall 410E, and the sixth internal wall 410F can be formed from the second ring 404 via negative manufacturing (e.g., formed via the removal of material from the second ring 404, etc.). In some examples, the first internal wall 410A, the second internal wall 410B. the third internal wall 410C, the fourth internal wall 410D, the fifth internal wall 410E, and the sixth internal wall 410F can be composed of a same material as the second ring 404. In other examples, the first internal wall 410A, the second internal wall 410B. the third internal wall 410C, the fourth internal wall 410D, the fifth internal wall 410E, and the sixth internal wall 410F can be composed of any suitable material (e.g., a metal, a plastic, a polymer, etc.).

In the illustrated examples of FIGS. 4A and 4D, the first internal wall 410A, the second internal wall 410B. the third internal wall 410C, the fourth internal wall 410D, the fifth internal wall 410E, and the sixth internal wall 410F are distributed evenly about circumference of the second ring 404 to help ensure the separator 302 is evenly balanced about the centerline 306. For example, the circumferential distance between each of the first internal wall 410A, the second internal wall 410B. the third internal wall 410C, the fourth internal wall 410D, the fifth internal wall 410E, and the sixth internal wall 410F is equal. In other examples, the first internal wall 410A, the second internal wall 410B. the third internal wall 410C, the fourth internal wall 410D, the fifth internal wall 410E, and the sixth internal wall 410F need not be evenly distributed. While the illustrated examples of FIGS. 4A-4D depict the second ring 404 that includes six internal walls (e.g., the first internal wall 410A, the second internal wall 410B. the third internal wall 410C, the fourth internal wall 410D, the fifth internal wall 410E, and the sixth internal wall 410F, etc.) and a corresponding six interior sections (e.g., the first interior section 408A, the second interior section 408B, the third interior section 408C, the fourth interior section 408D, the fifth interior section 408E, and the sixth interior section 408F, etc.), other separators implemented in accordance with the teachings of this disclosure can include an additional number of internal walls (e.g., four walls and four interior sections, seven walls and seven interior sections, twelve walls and twelve interior sections, etc.). In some examples, if each of the internal walls does not include a corresponding radially opposed wall (e.g., there are an odd number of walls, the walls are not evenly distributed, etc.), the separator 302 can include features (e.g., weight tabs, permeable walls, etc.) to help ensure the separator 302 is balanced.

In the illustrated example of FIG. 4D, the example outer annular portion 426 of the second ring 404 includes a first outboard opening 422A, a second outboard opening 422B, a third outboard opening 422C, a fourth outboard opening 422D, a fifth outboard opening 422E, and a sixth outboard opening 422F. In the illustrated example of FIG. 4D, the first outboard opening 422A opens into the first interior section 408A of the second ring 404, the second outboard opening 422B opens into the second interior section 408B of the second ring 404, the third outboard opening 422C opens into the third interior section 408C of the second ring 404, the fourth outboard opening 422D opens into the fourth interior section 408D of the second ring 404, the fifth outboard opening 422E opens into the fifth interior section 408E of the second ring 404, and the outboard opening 422F opens into the sixth interior section 408F of the second ring 404. In the illustrated example of FIG. 4D, the first outboard opening 422A, the second outboard opening 422B, the third outboard opening 422C, the fourth outboard opening 422D, the fifth outboard opening 422E, and the sixth outboard opening 422F are generally stadium-shaped (e.g., pill-shaped, disco-rectangular, etc.). In other examples, the first outboard opening 422A, the second outboard opening 422B, the third outboard opening 422C, the fourth outboard opening 422D, the fifth outboard opening 422E, and the sixth outboard opening 422F can have any other suitable shape (e.g., polygonal, oval-shaped, circular, etc.). In other examples, each of the first outboard opening 422A, the second outboard opening 422B, the third outboard opening 422C, the fourth outboard opening 422D, the fifth outboard opening 422E, and the sixth outboard opening 422F can be composed of multiple openings (not shown) (e.g., fluid can flow outboard from each of the first interior section 408A, the second interior section 408B, the third interior section 408C, the fourth interior section 408D, the fifth interior section 408E, and the sixth interior section 408F, etc. via multiple holes, etc.).

The example inner annular portion 424 of the second ring 404 includes a first interior opening 432A, a second interior opening 432B, a third interior opening 432C, a fourth interior opening 432D, a fifth interior opening 432E, and a sixth interior opening 432F. In the illustrated example of FIG. 4D, the first interior opening 432A, the second interior opening 432B, the third interior opening 432C, the fourth interior opening 432D, the fifth interior opening 432E, and the sixth interior opening 432F are disposed between the first interior section 408A, the second interior section 408B, the third interior section 408C, the fourth interior section 408D, the fifth interior section 408E, and the sixth interior section 408F and the first inboard opening 421A, the second inboard opening 421B, the third inboard opening 421C, the fourth inboard opening 421D, the fifth inboard opening 421E, and the sixth inboard opening 421F. In the illustrated example of FIGS. 4D, each of the first interior opening 432A, the second interior opening 432B, the third interior opening 432C, the fourth interior opening 432D, the fifth interior opening 432E, the sixth interior opening 432F, the first inboard opening 421A, the second inboard opening 421B, the third inboard opening 421C, the fourth inboard opening 421D, the fifth inboard opening 421E, and the sixth inboard opening 421F have the same shape. In other examples, some or all of the first interior opening 432A, the second interior opening 432B, the third interior opening 432C, the fourth interior opening 432D, the fifth interior opening 432E, and the sixth interior opening 432F, the first inboard opening 421A, the second inboard opening 421B, the third inboard opening 421C, the fourth inboard opening 421D, the fifth inboard opening 421E, and the sixth inboard opening 421F can have different shapes. In some examples, the inner annular portion 424 and the first interior opening 432A, the second interior opening 432B, the third interior opening 432C, the fourth interior opening 432D, the fifth interior opening 432E, and the sixth interior opening 432F can be absent (e.g., if the first ring 402 and the second ring 404 are integral components, etc.). In some such examples, the annular portion 418 of the first ring 402 can function as the inner wall of the first interior section 408A, the second interior section 408B, the third interior section 408C, the fourth interior section 408D, the fifth interior section 408E, and the sixth interior section 408F. In the illustrated example of FIGS. 4A, 4B, and 4D, the annular portion 418 of the first ring 402 directly abuts the inner annular portion 424 of the second ring 404. Additionally or alternatively, another structure (e.g., a buffer medium, a lattice structure, etc.) can be disposed between the annular portion 418 and the inner annular portion 424 of the second ring 404.

In the illustrated example of FIG. 4A, the first interior section 408A, the second interior section 408B, the third interior section 408C, the fourth interior section 408D, the fifth interior section 408E, and the sixth interior section 408F include a first axial opening 438A, a second axial opening 438B, a third axial opening 438C, a fourth axial opening 438D, a fifth axial opening 438E, and a sixth axial opening 438F, respectively, that vent separated oil from corresponding ones of the first interior section 408A, the second interior section 408B, the third interior section 408C, the fourth interior section 408D, the fifth interior section 408E, and the sixth interior section 408F. In the illustrated example of FIGS. 4A and 4B, the first axial opening 438A, the second axial opening 438B, the third axial opening 438C, the fourth axial opening 438D, the fifth axial opening 438E, and the sixth axial opening 438F open the second wall 430 of respective ones of the first interior section 408A, the second interior section 408B, the third interior section 408C, the fourth interior section 408D, the fifth interior section 408E, and the sixth interior section 408F to a cavity of the sump 303. In some examples, the first interior section 408A, the second interior section 408B, the third interior section 408C, the fourth interior section 408D, the fifth interior section 408E, and the sixth interior section 408F can include additional axial openings not illustrated) disposed on the first wall 428. The first axial opening 438A, the second axial opening 438B, the third axial opening 438C, the fourth axial opening 438D, the fifth axial opening 438E, and the sixth axial opening 438F are generally oval-shaped (e.g., elliptical, etc.). In other examples, the first axial opening 438A, the second axial opening 438B, the third axial opening 438C, the fourth axial opening 438D, the fifth axial opening 438E, and the sixth axial opening 438F can have any other suitable shape (e.g., polygonal, stadium-shaped, circular, etc.). In other examples, each of the first axial opening 438A, the second axial opening 438B, the third axial opening 438C, the fourth axial opening 438D, the fifth axial opening 438E, and the sixth axial opening 438F be composed of multiple openings.

The second ring 404 can be composed of any material (e.g., steel, titanium, aluminum, a nickel-alloy, etc.) that is suitable for the ambient temperature of the separator 302 and/or the mechanical stress associated with the rotation of the separator 302. The second ring 404 can be manufactured via negative manufacturing (e.g., machining, casting, drawing, forming, extrusion, punching, etc.), additive manufacturing, and/or a combination thereof. In the illustrated example of FIGS. 4A-4D, the first ring 402 is depicted as an integral component. In other examples, the second ring 404 can be composed of two or more discrete portions. For example, some or all of the inner annular portion 424, the outer annular portion 426, the first wall 428 and/or the second wall 430 can be manufactured separately and subsequently joined via one or more welds, one or more fasteners, etc.). While the first ring 402 and the second ring 404 are depicted as separate components in the illustrated example of FIGS. 4A-4D, in other examples, the first ring 402 and the second ring 404 can be integral components. In some such examples, the separator 302 can be manufactured via additive manufacturing.

The first piston seal 406A and the second piston seal 406B (e.g., piston rings, etc.) are seals that are disposed on an example exterior surface 427 (e.g., an outer surface, an outboard surface, etc.) of the second ring 404. In some examples, the first piston seal 406A is disposed on a first side (e.g., a forward side, etc.) of the first outboard opening 422A, the second outboard opening 422B, the third outboard opening 422C, the fourth outboard opening 422D, the fifth outboard opening 422E, and the sixth outboard opening 422F and the second piston seal 406B is disposed on a second side (e.g., an aft side, etc.) of the first outboard opening 422A, the second outboard opening 422B, the third outboard opening 422C, the fourth outboard opening 422D, the fifth outboard opening 422E, and the sixth outboard opening 422F. The first piston seal 406A and the second piston seal 406B can be composed of a plurality of stiff ring(S) (e.g., a metal ring, a polymer ring, a composite ring, etc.) coupled to the exterior surface 427 and a sealing ring (e.g., an elastomer ring, an O-ring, etc.) coupled to the stiff ring distal to the exterior surface 427.

The first piston seal 406A and the second piston seal 406B cause an example region 434 to be formed between the exterior surface 427, the walls of the first piston seal 406A and the second piston seal 406B, and an example annular wall 436 that is radially outward of the separator 302. The example annular wall 436 is an interior surface of the housing of the sump 303. In other examples, the identity and the function of the annular wall 436 can depend on the location and function of the separator 302. In other examples, the annular wall 436 can any other suitable shape (e.g., frustoconical, V-shaped, a curved interior, etc.). In the illustrated example of FIGS. 4A-4B, the separator 302 includes two piston rings (e.g., the first piston seal 406A and the second piston seal 406B, etc.). In other examples, the separator 302 can include an additional number of piston seals.

The first filter 414A, the second filter 414B, the third filter 414C, the fourth filter 414D, the fifth filter 414E, and the sixth filter 414F are disposed within the first filter mount 412A, the second filter mount 412B, the third filter mount 412C, the fourth filter mount 412D, the fifth filter mount 412E, and the sixth filter mount 412F in the first interior section 408A, the second interior section 408B, the third interior section 408C, the fourth interior section 408D, the fifth interior section 408E, and the sixth interior section 408F. The first filter 414A, the second filter 414B, the third filter 414C, the fourth filter 414D, the fifth filter 414E, and the sixth filter 414F can be disposed within the first filter mount 412A, the second filter mount 412B, the third filter mount 412C, the fourth filter mount 412D, the fifth filter mount 412E, and the sixth filter mount 412F via one or more press fits, one or more shrink fits, one or more chemical adhesives, one or more fastener(s), one or more weld(s), and/or a combination thereof. Additionally or alternatively, the first filter 414A, the second filter 414B, the third filter 414C, the fourth filter 414D, the fifth filter 414E, and the sixth filter 414F can be formed integrally with the first filter mount 412A, the second filter mount 412B, the third filter mount 412C, the fourth filter mount 412D, the fifth filter mount 412E, and the sixth filter mount 412F (e.g., via additive manufacturing, via casting, etc.). In some examples, the first filter 414A, the second filter 414B, the third filter 414C, the fourth filter 414D, the fifth filter 414E, and the sixth filter 414F can include one or more different separation mediums to separate a first fluid from a second fluid (e.g., the first filter 414A, the second filter 414B, the third filter 414C, the fourth filter 414D, the fifth filter 414E, and the sixth filter 414F are permeable to one of the fluids in the cavity 401 and are not permeable to other fluids in the cavity 401, etc.). Two example configurations of separation mediums within the first filter 414A, the second filter 414B, the third filter 414C, the fourth filter 414D, the fifth filter 414E, and the sixth filter 414F are described below in conjunction with FIGS. 5 and 6.

The first filter mount 412A, the second filter mount 412B, the third filter mount 412C, the fourth filter mount 412D, the fifth filter mount 412E, and the sixth filter mount 412F are structural components that retain the first filter 414A, the second filter 414B, the third filter 414C, the fourth filter 414D, the fifth filter 414E, and the sixth filter 414F within the second ring 404 of the separator 302. The first filter mount 412A, the second filter mount 412B, the third filter mount 412C, the fourth filter mount 412D, the fifth filter mount 412E, and the sixth filter mount 412F include holes that permit flow of fluids through the first filter 414A, the second filter 414B, the third filter 414C, the fourth filter 414D, the fifth filter 414E, and the sixth filter 414F. In some examples, the first filter mount 412A, the second filter mount 412B, the third filter mount 412C, the fourth filter mount 412D, the fifth filter mount 412E, and the sixth filter mount 412F block flow of the first fluid and the second fluid within the first interior section 408A, the second interior section 408B, the third interior section 408C, the fourth interior section 408D, the fifth interior section 408E, and the sixth interior section 408F, respectively, via fluid pathways other than the fluid pathway though the first filter 414A, the second filter 414B, the third filter 414C, the fourth filter 414D, the fifth filter 414E, and the sixth filter 414F, respectively. In the illustrated example of FIGS. 4A and 4D, the first filter mount 412A, the second filter mount 412B, the third filter mount 412C, the fourth filter mount 412D, the fifth filter mount 412E, and the sixth filter mount 412F extend along the entire axial length of the first interior section 408A, the second interior section 408B, the third interior section 408C, the fourth interior section 408D, the fifth interior section 408E, and the sixth interior section 408F, etc.). In the illustrated examples of FIGS. 4A and 4D, the first filter mount 412A, the second filter mount 412B, the third filter mount 412C, the fourth filter mount 412D, the fifth filter mount 412E, and the sixth filter mount 412F include corresponding inner surfaces and corresponding outer surfaces which have a same curvature as the inner diameter of the interior of the second ring 404 and the outer diameter of the exterior of the second ring 404, respectively. In other examples, the first filter mount 412A, the second filter mount 412B, the third filter mount 412C, the fourth filter mount 412D, the fifth filter mount 412E, and the sixth filter mount 412F can have any other geometry that blocks flow direct flow between the first inboard opening 421A, the second inboard opening 421B, the third inboard opening 421C, the fourth inboard opening 421D, the fifth inboard opening 421E, and the sixth inboard opening 421F and the first outboard opening 422A, the second outboard opening 422B, the third outboard opening 422C, the fourth outboard opening 422D, the fifth outboard opening 422E, and the sixth outboard opening 422F.

The first filter mount 412A, the second filter mount 412B, the third filter mount 412C, the fourth filter mount 412D, the fifth filter mount 412E, and the sixth filter mount 412F can be formed via any suitable manufacturing method (e.g., casting, machining, sheet forming, additive manufacturing, molding, etc.) and separately coupled within the interior of the second ring 404 (e.g., via one or more press fit(s), via one or more shrink fit(s), via one or more weld(s), via one or more fastener(s), etc.). In some such examples, the interior of the second ring 404 can include features to receive the first filter mount 412A, the second filter mount 412B, the third filter mount 412C, the fourth filter mount 412D, the fifth filter mount 412E, and the sixth filter mount 412F (e.g., bolt holes, weld locations, slots, etc.). In other examples, the first filter mount 412A, the second filter mount 412B, the third filter mount 412C, the fourth filter mount 412D, the fifth filter mount 412E, and the sixth filter mount 412F can be formed integrally with the second ring 404 (e.g., via casting, via additive manufacturing, etc.). In some examples, the first filter mount 412A, the second filter mount 412B, the third filter mount 412C, the fourth filter mount 412D, the fifth filter mount 412E, and the sixth filter mount 412F can be formed from the second ring 404 via negative manufacturing (e.g., formed via the removal of material from the second ring 404, etc.). The first filter mount 412A, the second filter mount 412B, the third filter mount 412C, the fourth filter mount 412D, the fifth filter mount 412E, and the sixth filter mount 412F can be composed of a same material as the second ring 404 and/or the first internal wall 410A, the second internal wall 410B. the third internal wall 410C, the fourth internal wall 410D, the fifth internal wall 410E, and the sixth internal wall 410F. In other examples, the first filter mount 412A, the second filter mount 412B, the third filter mount 412C, the fourth filter mount 412D, the fifth filter mount 412E, and the sixth filter mount 412F can be composed of any suitable material (e.g., a metal, a plastic, a polymer, etc.).

During operation, a first fluid (e.g., oil, etc.) and a second fluid (e.g., air, etc.) are contained within the cavity 401. As the cavity 401 and the separator 302 rotate, the first fluid and the second fluid are forced into the first inboard opening 421A, the second inboard opening 421B, the third inboard opening 421C, the fourth inboard opening 421D, the fifth inboard opening 421E, and the sixth inboard opening 421F of the separator 302 via centrifugal force. After flowing through the first inboard opening 421A, the second inboard opening 421B, the third inboard opening 421C, the fourth inboard opening 421D, the fifth inboard opening 421E, and the sixth inboard opening 421F of the first ring 402 and the first interior opening 432A, the second interior opening 432B, the third interior opening 432C, the fourth interior opening 432D, the fifth interior opening 432E, and the sixth interior opening 432F of the second ring 404, the first fluid and the second fluid enter the first interior section 408A, the second interior section 408B, the third interior section 408C, the fourth interior section 408D, the fifth interior section 408E, and the sixth interior section 408F of the second ring 404. The first fluid and the second fluid then flow through the separator 302 to the first filter 414A, the second filter 414B, the third filter 414C, the fourth filter 414D, the fifth filter 414E, and the sixth filter 414F. The first filter 414A, the second filter 414B, the third filter 414C, the fourth filter 414D, the fifth filter 414E, and the sixth filter 414F permit the passage of the second fluid (e.g., a fluid composed of comparatively smaller particles, etc.) therethrough. The second fluid, now separated from the second fluid, leaves the second ring 404 via the first outboard opening 422A, the second outboard opening 422B, the third outboard opening 422C, the fourth outboard opening 422D, the fifth outboard opening 422E, and the sixth outboard opening 422F and enters the region 434. In some such examples, after entering the sealed region 434, the second fluid can be vented from the separator 302 (e.g., to an exterior of a gas turbine engine, to an outboard frame fluid pathway, etc.) via a vent line (e.g., the vent line 304 of FIGS. 3A and 3B, etc.) in fluid communication with the region 434. For example, one or more vent line(s) (e.g., one or more tube(s), one or more pipe(s), etc.) can extend through the annular wall 436.

The first filter 414A, the second filter 414B, the third filter 414C, the fourth filter 414D, the fifth filter 414E, and the sixth filter 414F do not permit the passage or limit the passage of the first fluid (e.g., the fluid of comparatively larger particles, etc.) therethrough. The first fluid, now separated from the second fluid, then flows through the first axial opening 438A, the second axial opening 438B, the third axial opening 438C, the fourth axial opening 438D, the fifth axial opening 438E, and the sixth axial opening 438F back into the fluid cavity of the sump 303. In some examples, if the second fluid is viscous (e.g., the second fluid is oil, etc.) the second fluid can build a film of the axial walls 428, 430 of the first interior section 408A, the second interior section 408B, the third interior section 408C, the fourth interior section 408D, the fifth interior section 408E, and the sixth interior section 408F. In some examples, the film of the second fluid can form over the first axial opening 438A, the second axial opening 438B, the third axial opening 438C, the fourth axial opening 438D, the fifth axial opening 438E, and the sixth axial opening 438F, preventing the first fluid mixture/second fluid mixture from passing therethrough and while allowing the second fluid to be expelled therefrom. In the illustrated examples of FIGS. 3A-4D, the interior section is associated with the sump 303, and the first fluid is oil. In some such examples, the first fluid can then be recirculated to lubricate and cool components of the gas turbine engine 301. While FIGS. 3A-4D describe one application of the separator 302, the separator 302 can be used in a variety of applications. Some such other applications of the separator 302 are described below in conjunction with FIGS. 8A-10.

Figure 5:
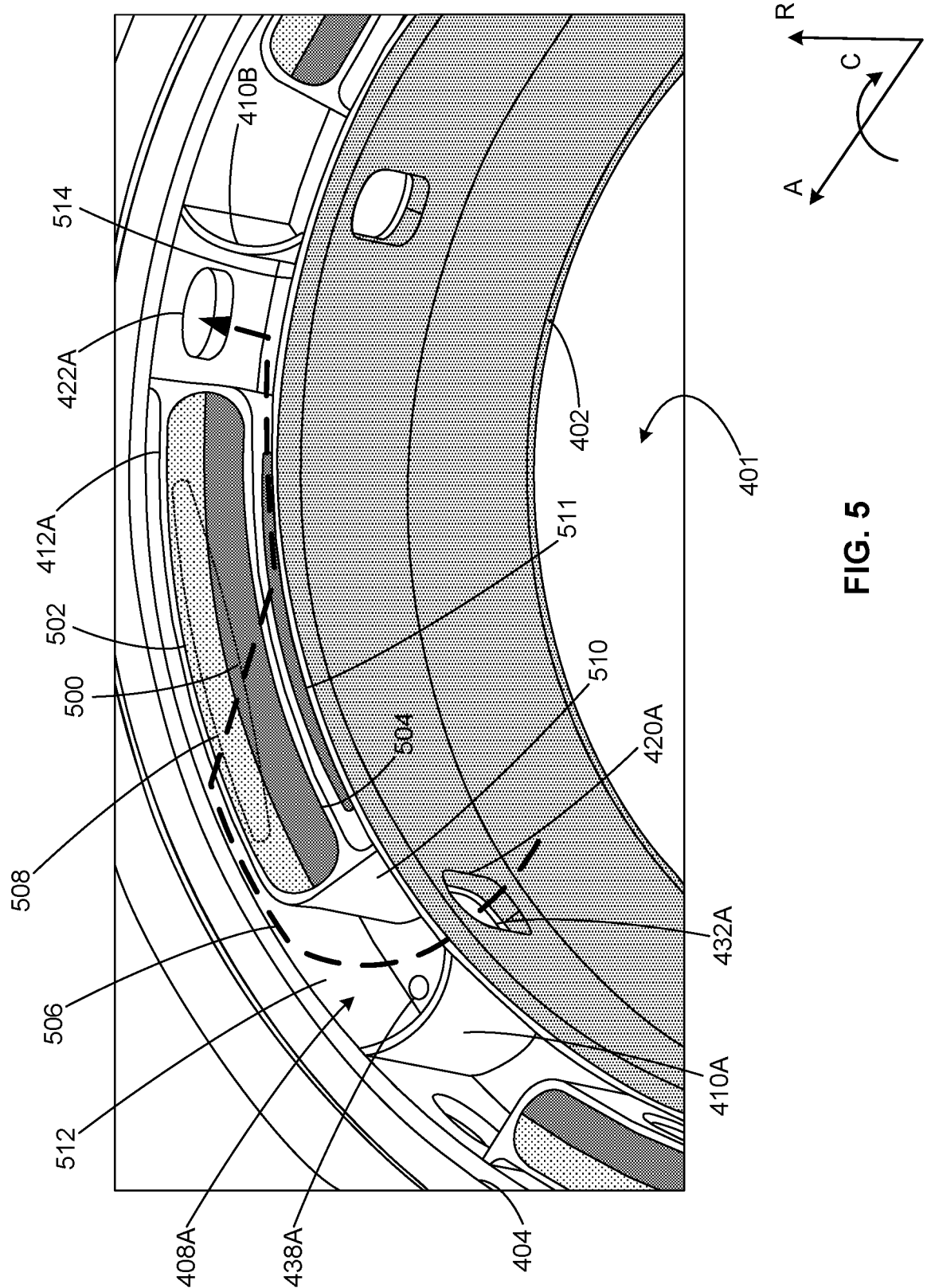
FIG. 5 is a perspective view of an example first filter configuration for use with the separator of FIGS. 3A-4D.

FIG. 5 is a perspective view of an example filter 500 that can implement one or more of the first filter 414A, the second filter 414B, the third filter 414C, the fourth filter 414D, the fifth filter 414E, and the sixth filter 414F of FIGS. 4A-4D of the separator 302 of FIGS. 3A-4D. The filter 500 is disposed within the first filter mount 412A of FIGS. 4A-4D and the first interior section 408A of FIGS. 4A-4D of the second ring 404 of FIGS. 4A-4D. In the illustrated example of FIG. 5, the filter 500 includes a first separation medium 502 and a second separation medium 504. In the illustrated example of FIG. 5, the filter 500 and the first interior section 408A define an example fluid pathway 506.

In the illustrated example of FIG. 5, the filter 500 includes two sequentially arranged separation mediums, the first separation medium 502 and the second separation medium 504, which are disposed radially within the filter mount 412A. In the illustrated example of FIG. 5, the first separation medium 502 is disposed radially outboard of the second separation medium 504. In some examples, the first separation medium 502 is more permeable (e.g., more porous, permits fluids of comparatively larger particles to pass through, etc.) than the second separation medium 504. In other examples, the first separation medium 502 can be less permeable than the second separation medium 504. In some examples, the filter 500 can include one or more additional separation mediums disposed between the first separation medium 502 and the second separation medium 504. Alternatively or additionally, the filter 500 can include one or more additional separation mediums disposed before and/or after the first separation medium 502 or the second separation medium 504.

In the illustrated example of FIG. 5, a fluid mixture from the cavity 401 flows through the first interior section 408A via the fluid pathway 506. The fluid pathway 506 includes the first inboard opening 421A and the first interior opening 432A, through which the fluid mixture (e.g., a combination of at least two fluids of different densities, a combination of at least two fluids with different particle sizes, etc.) flows into the first interior section 408A. In the first interior section 408A, the fluid mixture flows, via centrifugal force, along the fluid pathway 506 a portion of the first interior section 408A defined by an example first wall 510 of the filter mount 412A and the first internal wall 410A. The fluid continues on fluid pathway 506 to an example outer wall 512 of second ring 404 (e.g., the surface of the second ring 404 to the interior opening 432A, etc.). After reaching the outboard wall 512, the fluid mixture flows along the outboard wall 512 to an example first opening 508 (shown with phantom lines in FIG. 5) in the filter mount 412A formed on an outboard surface of the filter mount 412A. In some examples, the first opening 508 can be a plurality of openings. The first separation medium 502 and/or the second separation medium 504 blocks a portion of the fluid mixture (e.g., a first fluid, etc.) from passing through the filter 500 and permits other portions of the fluid mixture (e.g., a second fluid, etc.) to pass through the filter 500. The rejected portion of the fluid mixture then flows out of the filter 500 via the first openings 508, along the outboard wall 512, and back into the sump via the axial opening 438A and/or another axial opening on the opposite wall (not illustrated).

The portion of the fluid mixture permeable to the filter 500 leaves the filter 500 via an example second opening 511. In the illustrated example of FIG. 5, the second opening 511 is formed on the inboard wall of the first filter mount 412A. In some examples, the second opening 511 can be a plurality of openings. In some examples, the first opening 508 and the second opening 511 can a same shape. In other examples, the first opening 508 and the second opening 511 can have different shapes. After leaving the filter 500, the portion separated from the fluid mixture via the filter 500 flows along an example inboard wall 514 of the second ring 404 along the fluid pathway 506. The portion separated from the fluid mixture via the filter 500 then flows along the fluid pathway 506 out of the interior section 408A via an the first outboard opening 422A. After leaving the second ring 404 via the first outboard opening 422A, the permeable portion separated from the fluid mixture via the filter 500 can be vented via a vent line (e.g., the vent line 304 of FIGS. 3A and 3B, etc.), for example.

Figure 6:
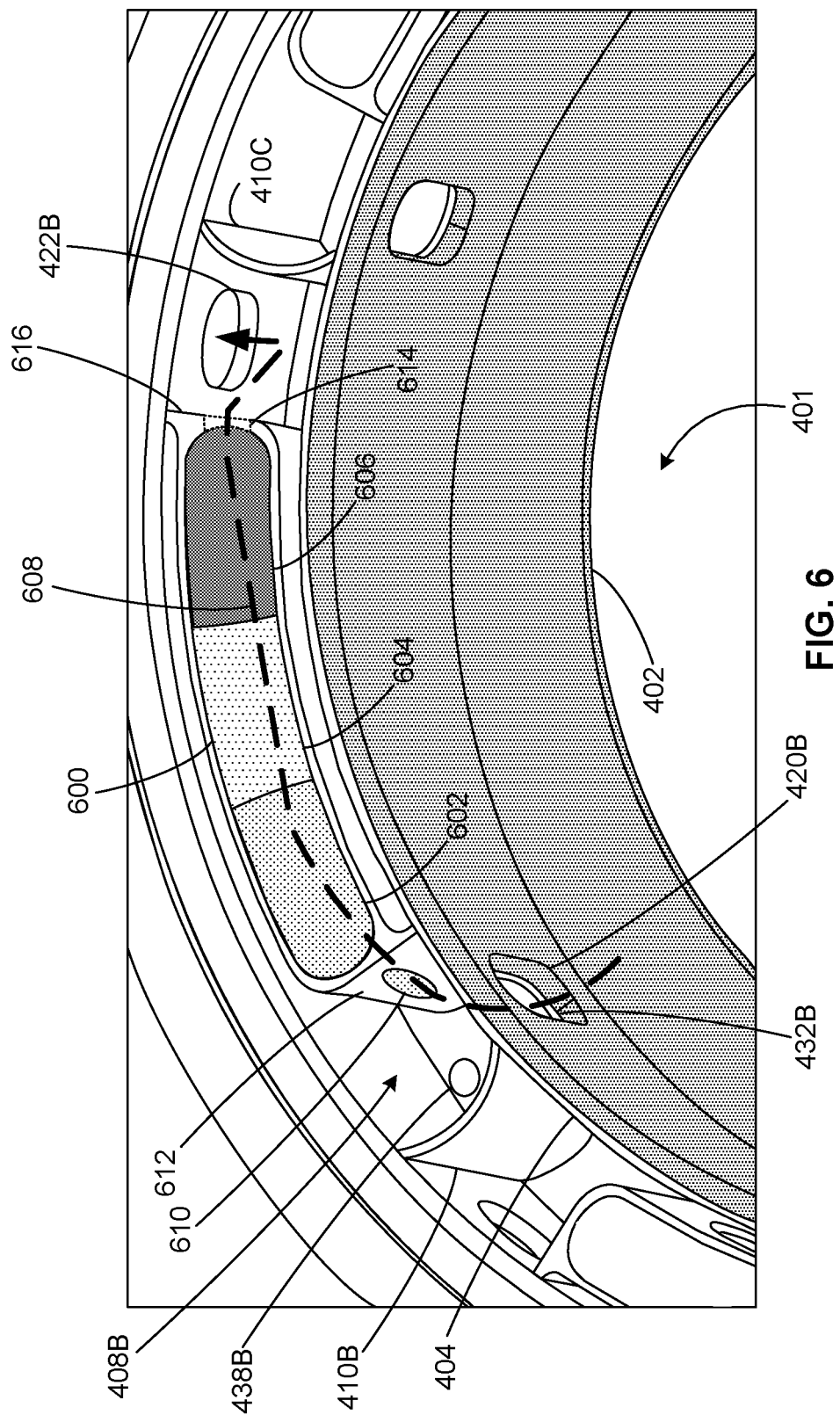
FIG. 6 is a perspective view of an example second filter configuration for use with the separator of FIGS. 3A-4D.

FIG. 6 is a perspective view of another example filter 600 that can be implemented as one or more of the first filter 414A, the second filter 414B, the third filter 414C, the fourth filter 414D, the fifth filter 414E, and the sixth filter 414F of FIGS. 4A-4D of the separator 302 of FIGS. 3A-4D. The filter 600 can be used in conjunction with filter 500 (e.g., the filters 500, 600 are not mutually exclusive, usable in different ones of the first interior section 408A, the second interior section 408B, the third interior section 408C, the fourth interior section 408D, the fifth interior section 408E, and the sixth interior section 408F, etc.). However, it will be understood that only a single type of filter can be utilized or any number of filter types can be utilized. The filter 600 will be described as being disposed within the second filter mount 412B of FIGS. 4B and 4D and the second interior section 408B of FIGS. 4A and 4D of the second ring 404 of FIGS. 4A-4D for ease of description. In the illustrated example of FIG. 6, the filter 600 includes a first separation medium 602, a second separation medium 604, and a third separation medium 606.

In the illustrated example of FIG. 6, the filter 600 includes three sequentially arranged separation mediums, the first separation medium 602, the second separation medium 604, and the third separation medium 606, which are disposed circumferentially within the filter mount 412A. In the illustrated example of FIG. 6, the first separation medium 602, the second separation medium 604, and the third separation medium 606 are arranged circumferentially within the filter mount 412A at a same radial position.

In some examples, the first separation medium 602 is more permeable (e.g., more porous, permits fluids of larger particles to pass through, etc.) than the second separation medium 604, and the second separation medium 604 is more permeable than the third separation medium 606. In other examples, the first separation mediums 602, the second separation medium 604, and the third separation medium 606 can have any other arrangements of permeabilities. In some examples, the filter 600 can include one or more additional separation mediums disposed between the first separation medium 602 and the second separation medium 604 and/or between the second separation medium 604 and the third separation medium 606.

In the illustrated example of FIG. 6, a fluid mixture from the cavity 401 flows through the second interior section 408B via the fluid pathway 608. The fluid pathway 608 includes the second inboard opening 421B of the first ring 402 and the second interior opening 432B, through which the fluid mixture (e.g., a combination of at least two fluids of different densities, etc.) flows into the second interior section 408B.

In the example second interior section 408B, the fluid mixture flows, via centrifugal force, along the fluid pathway 608 into a first opening 610 on a first wall 612 of the second filter mount 412B. In some examples, the first opening 610 can be a plurality of openings. The first separation medium 602, the second separation medium 604, and the third separation medium 606 permit a portion of the fluid mixture (e.g., a first fluid, etc.) from passing through the filter 600 and permit other portions of the fluid mixture (e.g., a second fluid, etc.) to pass through the filter 600. The rejected portion of the fluid mixture then flows out of the filter 600 via the first openings 610 sump via the axial opening 438A and/or another axial opening on the opposite wall (not illustrated). The portion of the fluid mixtures permeable to the filter 600 leaves the filter 600 via an example second opening 614 (shown with phantom lines in FIG. 6) on an example second wall 616. In some examples, the second opening 614 can be a plurality of openings. After leaving the filter 600, the permeable portion separated from the fluid mixture via the filter 600 mixture leaves the interior section 408A via the second outboard opening 422B. After leaving the second ring 404 via the second outboard opening 422B, the separated from the fluid mixture via the filter 600 can be vented via a vent line (e.g., the vent line 304 of FIGS. 3A and 3B, etc.), for example.

Figure 7:
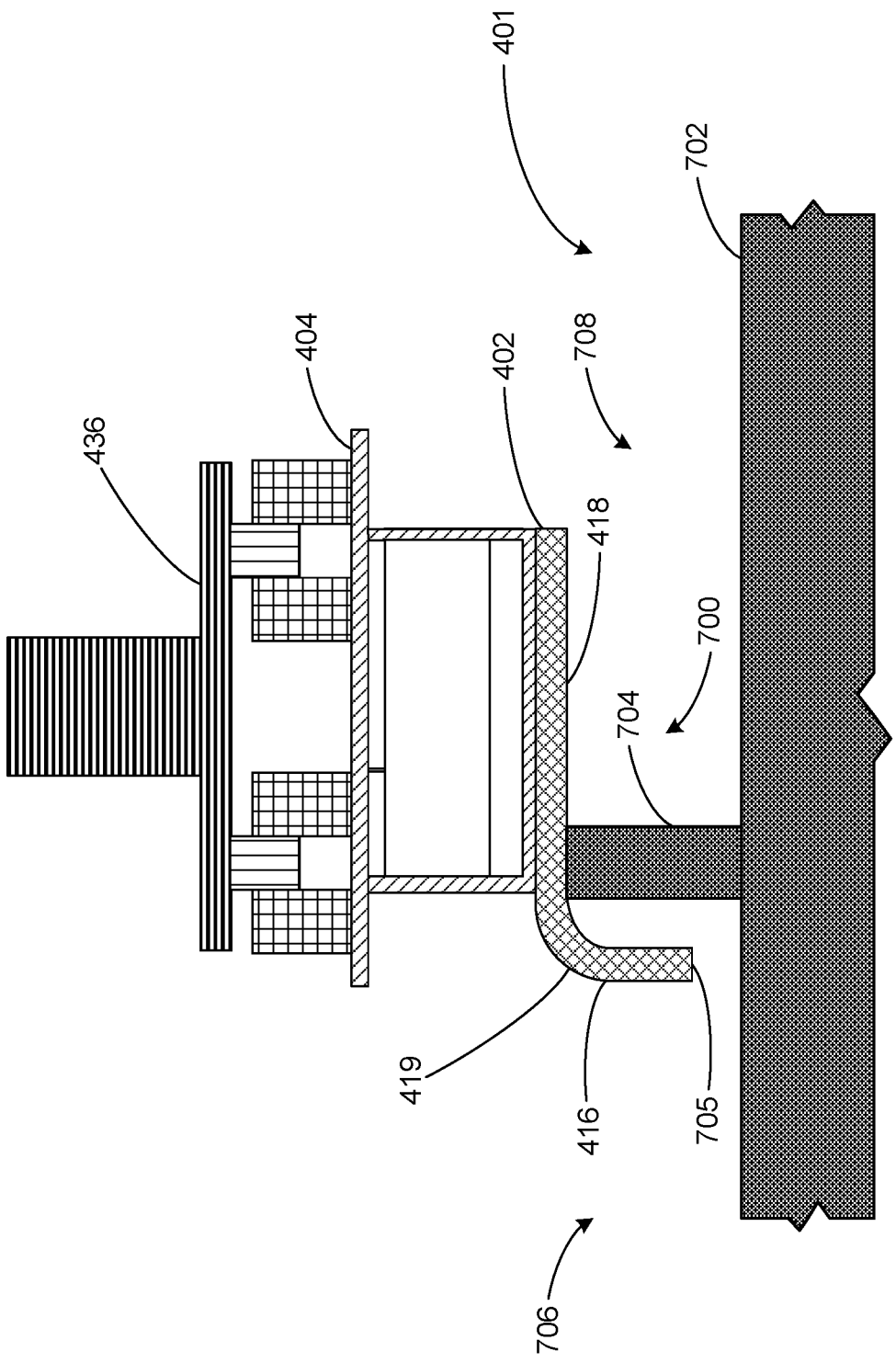
FIG. 7 is cross-sectional view of the separator of FIGS. 3A-4D illustrating an example mounting configuration of the separator.

FIG. 7 is a cross-sectional view of the separator 302 taken along the cross-sectional line A-A of FIG. 4A showing an example mounting configuration 700 of the separator 302. In the illustrated example of FIG. 7, the separator 302 is coupled to an example rotating shaft 702 via an example mounting boss 704. In some examples, the shaft 702 can be implemented by the LP shaft 136 of FIG. 1 (e.g., if the separator 302 is disposed in the first sump 178 of FIG. 1, etc.). In other examples, the shaft 702 can be associated with any other rotating component. In the illustrated example of FIG. 7, the mounting boss 704 extends between the shaft 702 and the annular portion 418 of the first ring 402. In some examples, the mounting boss 704 can be coupled to the shaft 702 via one or more welds and/or one or more fasteners. In other examples, the mounting boss 704 can be integral with the shaft 702. In some examples, the mounting boss 704 can be coupled to the first ring 402 via one or more welds and/or one or more fasteners. In some examples, the mounting boss 704 can be integral with the first ring 402.

While one example mounting configuration 700 is depicted in FIG. 7, it should be appreciated that other mounting configurations are also compatible with the separators disclosed herein. For example, the separator 302 can be coupled to the shaft 702 via one or more other portions of the first ring 402 (e.g., the lip portion 416, the transition portion 419, etc.) and/or to one or more portions of the second ring 404. In some such examples, an example distal end 705 of the lip portion 416 can be coupled directly to the shaft 702. In the illustrated example of FIG. 7, the mounting boss 704, the shaft 702 and the separator 302 divide the cavity 401 of FIG. 4A into an example first portion 706 and an example second portion 708. In the illustrated example of FIG. 7, fluid in the second portion 708 is able to flow into the separator 302 (e.g., via one or more of the first inboard opening 421A, the second inboard opening 421B, the third inboard opening 421C, the fourth inboard opening 421D, the fifth inboard opening 421E, and the sixth inboard opening 421F, etc.). In some examples, the second portion 708 is associated with a quiet zone of the sump. In some such examples, the first portion 706 can include a bearing associated with the sump (e.g., the sump 303).

In some examples, the first portion 706 and the second portion 708 can be in fluid communication (e.g., via one or more through holes in the mounting boss 704, via one or more through holes in the annular wall 436, etc.). In other examples, the first portion 706 can be fluidly isolated from the second portion 708. In some such examples, the first portion 706 can be a dry portion of the gas turbine engine 301 (e.g., not including the fluid to be separated by the separator 302, etc.).

In the illustrated examples of FIGS. 8A-8B, the separator 802 within an example sump 803 is disposed above an example oil seal 804 and fluidly coupled to an example fuel drain line 806. The sump system 800 can provide a similar function to the sump system 300 of FIGS. 3A and 3B. In some examples, the sump 803 of the sump system 800 can implement the forward sump 178 of FIG. 1. In some situations, during the operation of the gas turbine engine 801, fuel could leak from a portion of the gas turbine engine 801 (e.g., a combustor section, etc.) into the sump system 800, causing fuel and oil to mix.

The example separator 802 is similar to the separator 302 of FIGS. 3A-4D, except that the separator 802 is configured to separate oil and fuel (e.g., the first filter 414A, the second filter 414B, the third filter 414C, the fourth filter 414D, the fifth filter 414E, and the sixth filter 414F are configured to be permeable to fuel, but not permeable to oil, etc.). In the illustrated example of FIGS. 8A-8B, the separator 802 is disposed about an example centerline axis 808 of the gas turbine engine 801. In the illustrated example of FIGS. 8A-8B, the drain line 806 feeds to an outside of a through-frame of the gas turbine engine 801. In some examples, the drain line 806 can feed into a storage tank and/or another location to be removed when the gas turbine engine 801 is next serviced. While one drain line (e.g., the drain line 806, etc.) is depicted in FIGS. 8A-8B, in other examples, the sump system 800 can include an additional number of drain lines. While the sump system 800 is described as implementing a forward sump (e.g., the first sump 178 of FIG. 1), the separator 802 can be used in any other sump system, including an aft sump of the gas turbine engine 801. In some examples, the configuration of FIGS. 8A-8B of the sump system 800 and separator 802 can be used in conjunction with the configuration of the sump system 300 and separator 302 of FIGS. 3A and 3B (e.g., if the separator 302 is above the oil seal 804, etc.). In such examples, a single separator implemented in accordance with the teachings of this disclosure can separate fuel from oil and air from oil. In some such examples, an outboard portion of the separator (e.g., the region 434 of FIGS. 4B and 4C, etc.) can be in fluid communication with an air vent line (e.g., the vent line 304 of FIGS. 3A and 3B, etc.), and a fuel drain line (e.g., the fuel drain line 806 of FIGS. 8A and 8B, etc.). For example, the sump system 800 can include an air vent line oriented toward a top of the gas turbine engine 801 (e.g., away from the ground, etc.) such that the separated air flows upward and the fuel drain line 806 oriented downward toward a bottom of the gas turbine engine 801 (e.g., towards the ground, etc.) such that the separated fuel flows downward due to the comparative greater density of fuel. In some such examples, the fuel drain line 806 leads outside of the engine to mitigate risk of fuel entering inappropriate portions of the gas turbine engine 801.

Figure 9A:
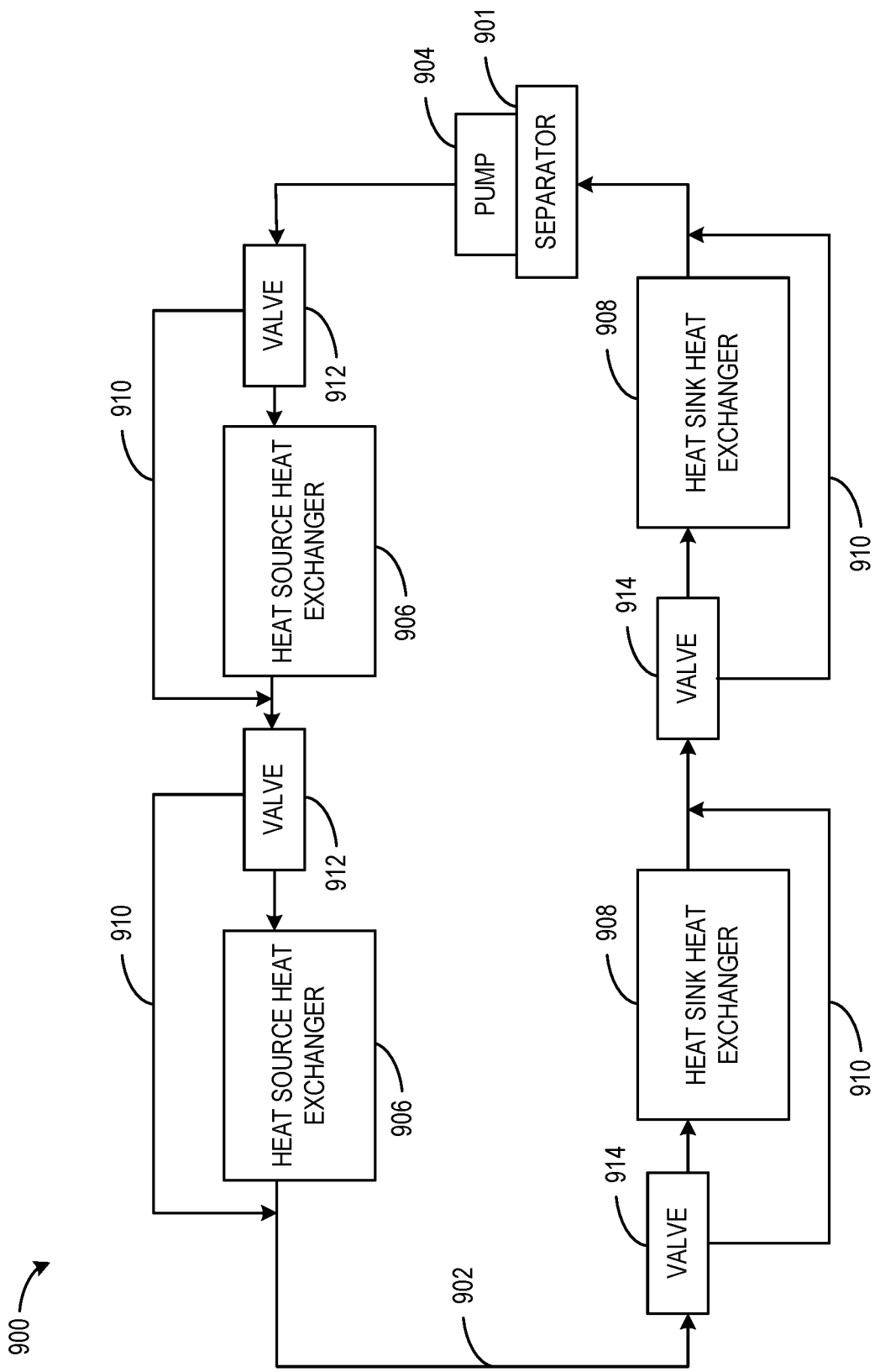
FIG. 9A is a system diagram for a thermal management system.

FIG. 9A is a system diagram of an example thermal management system 900 including an example separator 901 that can be used in conjunction with the gas turbine engine (e.g., a gas turbine engine similar to the gas turbine engine of FIG. 1, etc.). In the illustrated example of FIG. 9A, the thermal management system 900 includes a thermal transport bus 902 and an example pump 904 configured to pump the heat exchange fluid therethrough. In the examples described in conjunction with FIGS. 8A and 8B, the thermal transport bus 902 is configured as one or more fluid conduits through which super critical carbon dioxide (sCO2) flows as a heat exchange fluid and is separated by phase by the separator 901. In other examples, the systems of FIGS. 8A and 8B can use other heat exchange fluids, which can be similarly separated by the separator 901.

In the illustrated example of FIG. 9A, the thermal management system 900 includes one or more heat source heat exchangers 906 arranged along the thermal transport bus 902. The heat source heat exchanger(s) 906 is fluidly coupled to the thermal transport bus 902 such that the heat exchange fluid flows through the heat source heat exchanger(s) 906. Although FIG. 9A illustrates two heat source heat exchangers 906, the thermal management system 900 may include a single heat source heat exchanger 906 or three or more heat source heat exchangers 906.

The heat source heat exchanger(s) 906 cools a fluid supporting the operation of a gas turbine engine. For example, at least one of the heat exchanger(s) 906 can cool a lubrication system(s) of the gas turbine engine. In some such examples, the heat exchanger(s) 906 transfers heat from the oil lubricating the engine(s) 110 to the heat transfer fluid. Additionally or alternatively, at least one of the heat exchanger(s) 906 can cool one or more other systems of a gas turbine engine (e.g., a compressor section, etc.). The heat source heat exchanger(s) 906 may be implemented by a plate heat exchanger(s) (e.g., a plate fin heat exchanger(s), a pillow plate heat exchanger(s), a plate and frame heat exchanger(s), a plate and shell heat exchanger(s), a spiral plate heat exchanger(s), etc.), a rotary-type regenerative heat exchanger(s), a shell and tube heat exchanger(s) (e.g., a double pipe heat exchanger(s)), etc.), or any other type of heat exchanger. The heat source heat exchanger(s) 906 may be formed of metal, graphite, ceramic, or any other material with a high thermal conductivity and melting point.

In the illustrated example of FIG. 9A, the thermal management system 900 includes one or more heat sink heat exchanger(s) 908 arranged along the thermal transport bus 902. More specifically, the heat sink heat exchanger(s) 908 are fluidly coupled to the thermal transport bus 902 such that the heat exchange fluid flows through the heat sink heat exchanger(s) 908. In this respect, the heat sink heat exchanger(s) 908 are configured to transfer heat from the heat exchange fluid to other fluids supporting the operation of a gas turbine engine or another component of an aircraft. Thus, the heat sink heat exchanger(s) 908 removes heat from the heat exchange fluid. Although the example of FIG. 9A, illustrates two heat sink heat exchangers 908, the thermal management system 900 may include additional heat sink heat exchangers.

In some examples, at least one of the heat exchanger(s) 908 is a heat exchanger(s) of the fuel system(s) of the engine(s) 110. In such an example, the fuel system heat exchanger(s) 908 transfers heat from the heat transfer fluid to the fuel supplied to the engine(s) 110. The heat sink heat exchanger(s) 908 may be implemented by a plate heat exchanger(s) (e.g., a plate fin heat exchanger(s), a pillow plate heat exchanger(s), a plate and frame heat exchanger(s), a plate and shell heat exchanger(s), a spiral plate heat exchanger(s), etc.), a rotary-type regenerative heat exchanger(s), a shell and tube heat exchanger(s) (e.g., a double pipe heat exchanger(s)), etc.), or any other type of heat exchanger. Further, the heat sink heat exchanger(s) 908 may be formed of metal, graphite, ceramic, or any other material with a high thermal conductivity and melting point.

The thermal management system 900 includes a plurality of the bypass conduits 910. In the illustrated example of FIG. 9A, each of the bypass conduits 910 is fluidly coupled to the thermal transport bus 902 such that the corresponding bypass conduit 910 allows at least a portion of the heat exchange fluid to bypass one of the heat exchanger(s) 906, 908. In some examples, the heat exchange fluid bypasses one or more of the heat exchanger(s) 906, 908 to adjust the temperature of the heat exchange fluid within the thermal transport bus 902. The flow of example heat exchange fluid through the bypass conduits 910 is controlled to regulate the pressure of the heat exchange fluid within the thermal transport bus 902. In the illustrated example of FIG. 9A, each heat exchanger 906, 908 has a corresponding bypass conduit 910. In other examples, any number of the heat exchanger(s) 906, 908 may have a corresponding bypass conduit 910 so long as there is at least one bypass conduit 910.

Additionally, in several examples, the thermal management system 900 includes one or more heat source valves 912 and one or more heat sink valves 914. In general, each heat source valve 912 is configured to control the flow of the heat exchange fluid through a bypass conduit 910 that bypasses at least one of the heat source heat exchanger(s) 906. Similarly, each heat sink valve 914 is configured to control the flow of the heat exchange fluid through a bypass conduit 910 that bypasses a heat sink heat exchanger 908. In this respect, each valve 912, 914 is fluidly coupled to the thermal transport bus 902 and a corresponding bypass conduit 910. As such, each valve 912, 914 may be moved between fully and/or partially opened and/or closed positions to selectively occlude the flow of heat exchange through its corresponding bypass conduit 910.

The pump 904 drives the flow of the heat exchange fluid through the thermal management system 900. In some examples, the thermal management system 900 can include additional pumps in addition to the pump 904 illustrated in FIG. 9A, depending on the desired flow rate, delta pressure across the pump 904, and/or the kinetic energy loss of the heat exchange fluid in the thermal transport bus 902. In some examples, if the pump 904 encounters sCO2 in the liquid phase (e.g., not the gaseous phase, etc.), the pump 904 could be damaged. In the illustrated example of FIG. 9A, the separator 901 is disposed upstream of the pump 904 in the thermal management system 900 and separates liquid sCO2 from gaseous sCO2, thereby mitigating potential negative effects to pump 904 caused by the liquid sCO2. The configuration of the pump 904 and the separator 901 are described below in FIG. 9B in additional detail.

Figure 9B:
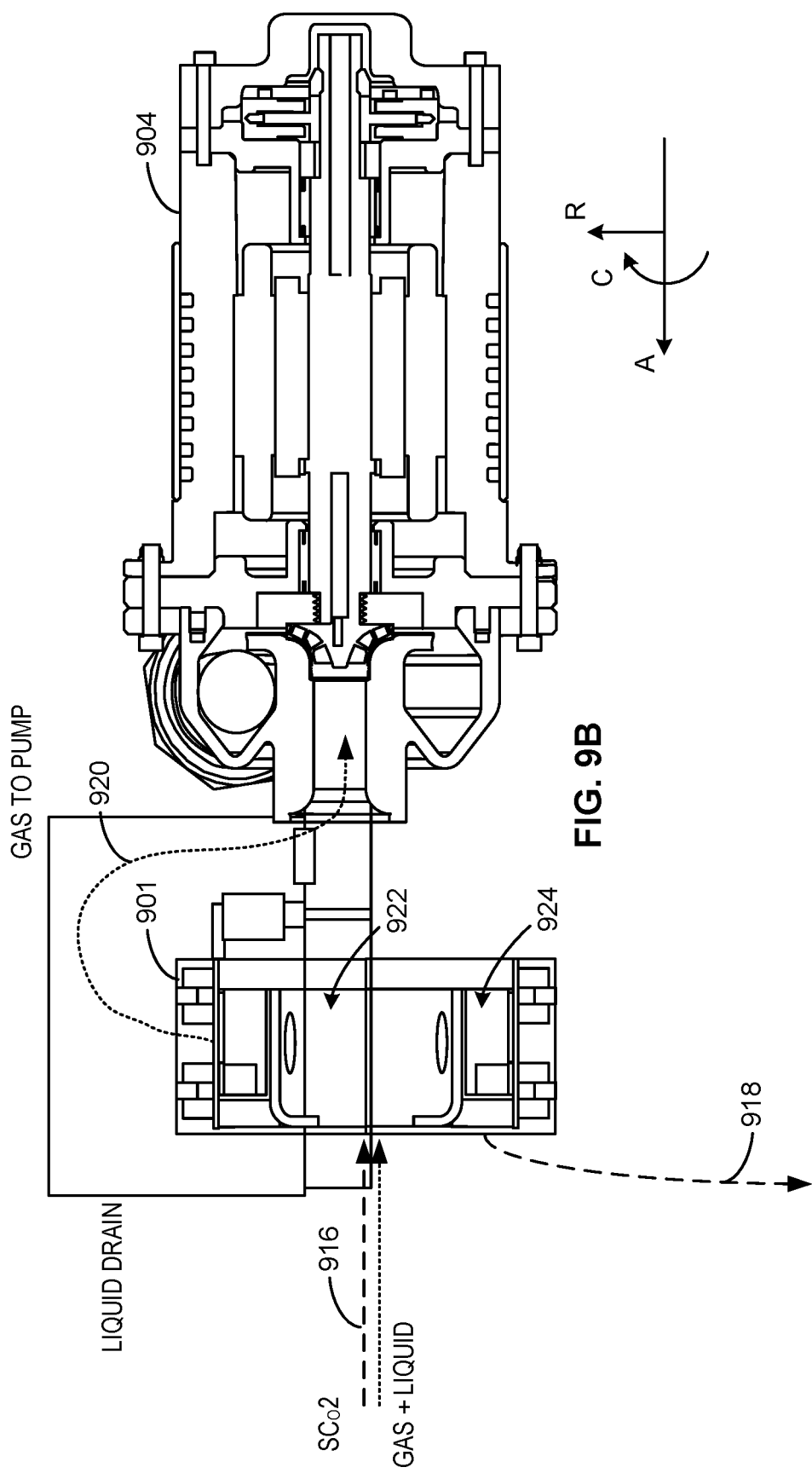
FIG. 9B is a front view of thermal pump of FIG. 9A including a separator implemented in accordance with the teachings of this disclosure.

FIG. 9B is a front view of the pump 904 and the separator 901 of FIG. 9A. In the illustrated example of FIG. 9B, the separator 901 receives an example inlet line 916 of sCO2, and outputs an example first outlet line 918 of liquid sCO2 and an example second outlet line 920 of gaseous sCO2. The example separator 901 can be similar to the separator 302 of FIGS. 3A-4D, except the separator 901 is disposed upstream of the pump 904 (e.g., separate from a sump of a gas turbine engine, etc.) and is configured to separate liquid sCO2 from gaseous sCO2 (e.g., the first filter 414A, the second filter 414B, the third filter 414C, the fourth filter 414D, the fifth filter 414E, and the sixth filter 414F are configured to be permeable to gaseous sCO2, but not permeable to liquid sCO2, etc.). The separator 901 is disposed upstream the pump 904 in the thermal management system 900 to separate liquid sCO2 from gaseous sCO2 and to prevent damage to the pump 904. As inlet line 916 enters an example inner cavity 922 of the separator 901, centrifugal force drives the inlet line 916 into a plurality of interior sections 924 with including a plurality of filters (not illustrated in FIG. 9B). The filters of the separator 901 separate the liquidus sCO2 from the gaseous sCO2 and vent the liquidus sCO2 via the first outlet line 918. The filters of the separator 901 allow the gaseous sCO2 via the second outlet line 920 to enter the pump 904. The separator 901 prevents liquid sCO2 from entering the pump 904, which prevents potential damage to the pump 904. In some examples, the rotation of the separator 901 can be driven via the pump 904, directly via one or more of the spools of the gas turbine engine including the thermal management system 900, via an AGB of the gas turbine engine, and/or a dedicated motor for the separator 901. For example, the separator 901 can be coupled to a shaft associated with the pump 904 in a mounting configuration similar to the mounting configuration 700 of FIG. 7. In other examples, the separator 901 can be mounted in any other suitable manner.

The first outlet line 918 is coupled to the separator 901 (e.g., to an axial wall of the separator via openings similar to the first interior opening 432A, the second interior opening 432B, the third interior opening 432C, the fourth interior opening 432D, the fifth interior opening 432E, and the sixth interior opening 432F of FIG. 4A, etc.). In some examples, the first outlet line 918 can feed the separator 901 into a portion of the thermal management system 900 upstream of the pump 904. In other examples, the first outlet line 918 can feed to a storage tank and/or another location to be removed when the gas turbine engine housing the thermal management system 900 is next serviced. While one outlet line for the liquid sCO2 (e.g., the first outlet line 918, etc.) is depicted in FIG. 9B, in other examples, the thermal management system 900 can include an additional number of outlet lines for the liquid sCO2.

Figure 10:
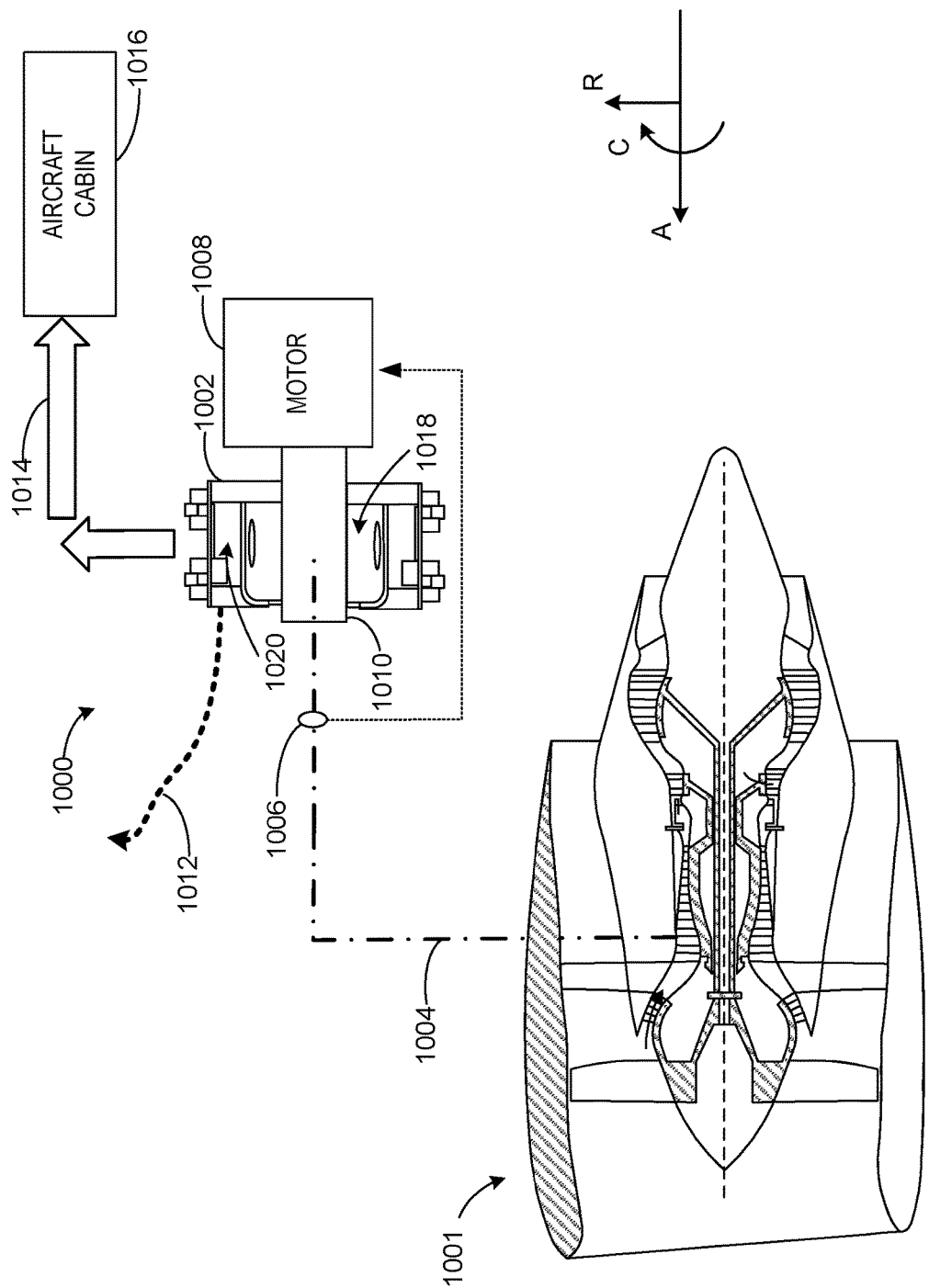
FIG. 10 is a schematic view of a bleed line including a separator implemented in accordance with the teachings of this disclosure.

FIG. 10 is a schematic view of an example cabin bleed system 1000 of an example gas turbine engine 1001 including another example separator 1002 implemented in accordance with the teachings of this disclosure. In the illustrated example, the cabin bleed system 1000 includes an example bleed line 1004, an example particulate matter sensor 1006, an example motor 1008, an example shaft 1010, an example first outlet line 1012, and example second outlet line 1014, which is coupled to an example aircraft cabin 1016. In the illustrated example of FIG. 10, the separator 1002 is disposed in a bleed system 1000 (e.g., not within a sump of the gas turbine engine 1001, etc.).

The gas turbine engine 1001 can be implemented by the gas turbine engine 100 of FIG. 1. In other examples, the gas turbine engine 1001 can be implemented by any other type of gas turbine engine (e.g., a turboprop, a turboshaft, etc.). In the illustrated example of FIG. 10, the gas turbine engine 1001 is associated with the aircraft cabin 1016. The aircraft cabin 1016 is portion of the aircraft that includes passengers, cargo, and/or other things being transported. The aircraft cabin 1016 includes a pressurized space, which can be pressurized by air provided by bleed line 1004 of the gas turbine engine 1001. In the illustrated example of FIG. 10, the bleed line 1004 is receives pressured air from the high-pressure compressor of the gas turbine engine 1001 (e.g., the high-pressure compressor 124 of FIG. 1, etc.). In other examples, the high-pressure compressor 124 can receive pressurized air for any other portion of the gas turbine engine 1001 (e.g., the LP compressor 122, etc.). In some examples, the air from the bleed line 1004 can include unwanted particulate matter that could be unpleasant and/or hazardous for passengers in the aircraft cabin 1016 (e.g., smoke, coke, other oils, other liquids, etc.). For example, such particulate matter in the bleed line 1004 could have an unpleasant odor. Additionally or alternatively, such particulate matter in the bleed line 1004 could stain and/or discolor portions of the aircraft cabin 1016, which increase the amount of servicing required for the aircraft cabin 1016. In some examples, oil and/or fuel in the bleed line 1004 can be indicative of leakage in a sump of the gas turbine engine 1001.

In the illustrated example of FIG. 10, the shaft 1010 extends through and is coupled to the separator 1002 at a first location and is coupled to the motor 1008 at a second location. The motor 1008 converts energy (e.g., mechanical work, electrical energy, etc.) into mechanical energy via the rotation of the shaft 1010. The rotation of the shaft 1010 similarly causes the rotation of the separator 1002. In some examples, the motor 1008 can be coupled to a spool of the gas turbine engine 1001 and/or an AGB of the gas turbine engine 1001. In other examples, the motor 1008 can receive power from a power source associated with the aircraft cabin 1016.

In the illustrated example of FIG. 10, the bleed line 1004 includes the particulate matter sensor 1006 (e.g., an oil sensor, etc.) upstream of the aircraft cabin 1016 and the separator 1002. In some examples, the particulate matter sensor 1006 can detect particulate matter in the bleed line 1004 (e.g., gaseous hydrocarbons, smoke, etc.) and output a signal. In some examples, the motor 1008 (e.g., a processing unit associated with the motor 1008, etc.) can detect the output signal and begin to rotate the shaft 1010. For example, the separator 1002 can be coupled to the shaft 1010 in a mounting configuration similar to the mounting configuration 700 of FIG. 7. In other examples, the separator 1002 can be mounted in any other suitable manner.

The example separator 1002 can be for example the separator 302 of FIGS. 3A-4D, except the separator 1002 is configured to separate particulate matter (e.g., smoke, burnt oil, etc.) from air (e.g., the first filter 414A, the second filter 414B, the third filter 414C, the fourth filter 414D, the fifth filter 414E, and the sixth filter 414F are configured to be permeable to air, but not permeable to particulate matter, etc.). In some examples, the separation materials of the filters of the separator 1002 can be implemented by a high-efficiency particulate absorbing (HEPA) material and/or another porous material. As flow from the bleed line 1004 enters an example inner cavity 1018 of the separator 1002 centrifugal force drives flow from the bleed line 1004 into a plurality of interior sections 1020 including a plurality of filters (not illustrated in FIG. 10). The filters of the separator 1002 separate the particulate matter from the air of the bleed and vent the particulate matter via the first outlet line 1012 (e.g., coupled to the separator 1002 via holes similar to the first interior opening 432A of FIG. 4D, etc.). In other examples, the particulate matter from the bleed line 1004 can remain embedded in the filters of the separator 1002. As such, the use of the separator 1002 can prevent unpleasant smells in the aircraft cabin 1016 caused by leakage in the gas turbine engine 1001 and other sources.

From the foregoing, it will be appreciated that example systems, apparatus, and articles of manufacture have been disclosed that enable manufacture of an advantageous fluid separators for use in gas turbine engines. Separators disclosed herein can be used in conjunction with sumps. Separators disclosed herein that separator oil from air are disposed within the sumps and thus, operate at higher rotational speeds that prior separators. Separators disclosed herein have increased separation efficiency, thereby reducing the amount of lost oil from the gas turbine engine. Some separators disclosed herein also enable the separation of oil and fuel in the event of a fuel-in-oil condition without the need for a specific relief vent circuit.

Further aspects of the present disclosure are provided by the subject matter of the following clauses:

Example 1 includes a separator, comprising a first ring including a first surface, a second surface opposite the first surface, and a first opening extending from the first surface to the second surface, a second ring surrounding the first ring, the second ring including a third surface, a fourth surface, and a second opening extending from the first surface to the second surface, and a filter disposed between the first ring and the second ring, the filter disposed in a fluid pathway extending between the first opening and the second opening.

Example 2 includes the separator of any proceeding clause, wherein the filter is a first filter, the fluid pathway is a first fluid pathway, the first ring includes a first plurality of openings including the first opening, and the second ring includes a second plurality of openings including the second opening, the separator further including a plurality of filters including the first filter, each of the plurality of filters disposed in a corresponding fluid pathway defined by a first one of the first plurality of openings and a second one of the second plurality of openings.

Example 3 includes the separator of any proceeding clause, wherein the plurality of filters has an even quantity and the plurality of filters are distributed evenly about a centerline axis of the first ring.

Example 4 includes the separator of any proceeding clause, further including a first piston seal disposed on an external surface of the second ring.

Example 5 includes the separator of any proceeding clause, further including a second piston seal, the second opening disposed between the first piston seal and the second piston seal.

Example 6 includes the separator of any proceeding clause, wherein the third surface is spaced from and disposed radially outward of the fourth surface, the third surface and the fourth surface defining an interior, and a plurality of walls disposed within the interior, the plurality of walls dividing the interior into a plurality of interior sections.

Example 7 includes the separator of any proceeding clause, wherein each of the plurality of interior sections is fluidly sealed from other ones of the plurality of interior sections.

Example 8 includes the separator of any proceeding clause, wherein the second ring further includes a mount disposed within the interior, the mount including the filter disposed therein, the mount including a third opening on a first side of the filter, and a fourth opening on a second side of the filter, the second side opposite the first side, the filter disposed between the third opening and the fourth opening.

Example 9 includes the separator of any proceeding clause, wherein the third opening and the fourth opening are arranged such that the fluid pathway extends circumferentially though the filter.

Example 10 includes the separator of any proceeding clause, wherein the filter includes a first separation medium abutting the third opening, and a second separation medium abutting the fourth opening, the second separation medium denser than the first separation medium.

Example 11 includes the separator of any proceeding clause, wherein the third opening is radially outward of the fourth opening.

Example 12 includes a gas turbine engine comprising a shaft configured to rotate during operation of the gas turbine engine, the shaft disposed within a cavity containing a first fluid and a second fluid, the second fluid having a different density than the first fluid, and a separator coupled to the shaft, the separator including a first ring including a first opening, the first opening receiving the first fluid and the second fluid from the cavity, a second ring surrounding the first ring, and a filter disposed between the first ring and the second ring, a rotation of the separator causing the first fluid and the second fluid to flow through a fluid pathway including the filter, the fluid pathway separating the first fluid from the second fluid.

Example 13 includes the gas turbine engine of any proceeding clause, wherein the second ring includes a second opening downstream on the fluid pathway from the filter, second opening to expel the second fluid from the separator.

Example 14 includes the gas turbine engine of any proceeding clause, further including a first piston seal disposed on an external surface of the second ring, and a second piston seal disposed on the external surface, the first piston seal on an opposite side of the second opening as the first opening.

Example 15 includes the gas turbine engine of any proceeding clause, wherein the second ring includes a first surface, and a second surface disposed radially outward of the first surface, the first surface and the second surface defining an interior, and a plurality of fluidly sealed walls disposed within the interior, the plurality of fluidly sealed walls dividing the interior into a plurality of interior sections.

Example 16 includes the gas turbine engine of any proceeding clause, wherein each of the plurality of interior sections includes a corresponding one of a plurality of filters, the plurality of filters including the filter.

Example 17 includes the gas turbine engine of any proceeding clause, wherein, the first fluid is oil and the second fluid is air.

Example 18 includes the gas turbine engine of any proceeding clause, wherein the separator is disposed within an oil seal diameter of a sump.

Example 19 includes the gas turbine engine of any proceeding clause, wherein the shaft is associated with a supercritical carbon dioxide pump, the first fluid is liquid supercritical carbon dioxide, and the second fluid is gaseous supercritical carbon dioxide.

Example 20 includes the gas turbine engine of any proceeding clause, wherein the shaft is associated with a bleed system, the bleed system including a bleed line upstream of a cabin of an aircraft associated with the gas turbine engine, the second fluid is air, and the first fluid includes at least one of oil, fuel, smoke, or coke.

Example 21 includes an apparatus comprising a first ring including a first opening, a second ring surrounding the first ring, the second ring including a second opening, and a filter disposed between the first ring and the second ring, the filter disposed in a flow path extending between the first opening and the second opening.

Example 22 includes the apparatus of any preceding claims, wherein the filter is a first filter, the flow path is a first flow path, the first ring includes a first plurality of openings including the first opening, and the second ring includes a second plurality of openings including the second opening, the apparatus further including a plurality of filters including the first filter, each of the plurality of filters disposed in a corresponding flow path defined by a first one of the first plurality of openings and a second one of the second plurality of openings.

Example 23 includes the apparatus of any preceding claims, wherein the plurality of filters has an even quantity and each of the plurality of filters is distributed evenly about a centerline axis of the first ring.

Example 24 includes the apparatus of any preceding claims, further including a piston seal disposed on a first surface of the second ring.

Example 25 includes the apparatus of any preceding claims, wherein the piston seal is a first piston seal, and the apparatus further includes a second piston seal, the second opening disposed between the first piston seal and the second piston seal.

Example 26 includes the apparatus of any preceding claims, wherein the second ring includes a first surface, and a second surface disposed radially outward of the first surface, the first surface and the second surface defining an interior, and a plurality of walls disposed within the interior, the plurality of walls dividing the interior into a plurality of interior sections.

Example 27 includes the apparatus of any preceding claims, wherein each of the plurality of the interior sections is fluidly sealed.

Example 28 includes the apparatus of any preceding claims, wherein the second ring further includes a mount disposed within the interior, the mount including the filter disposed therein, the mount including a third opening on a first side of the filter, and a fourth opening on a second side of the filter, the second side opposite the first side.

Example 29 includes the apparatus of any preceding claims, wherein the third opening and the fourth opening are arranged such that the flow path extends circumferentially though the filter.

Example 30 includes the apparatus of any preceding claims, wherein the filter includes a first separation medium abutting the third opening, and a second separation medium abutting the fourth opening, the second separation medium denser than the first separation medium.

Example 31 includes the apparatus of any preceding claims, wherein the first opening is radially outward of the second opening.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The following claims are hereby incorporated into this Detailed Description by this reference, with each claim standing on its own as a separate embodiment of the present disclosure.

What is claimed is:

1. A separator, comprising:
   a first ring including:
      a first surface;
      a second surface opposite the first surface; and
      a first opening extending from the first surface to the second surface;
   a second ring surrounding the first ring, the second ring including:
      a third surface;
      a fourth surface, the third surface is spaced from and disposed radially outward of the fourth surface, the third surface and the fourth surface defining an interior;
      a plurality of walls disposed within the interior, the plurality of walls dividing the interior into a plurality of interior sections; and
      a second opening extending through the fourth surface; and
   a filter disposed between the first ring and the second ring, the filter disposed in a fluid pathway extending between the first opening and the second opening.

2. The separator of claim 1, wherein the filter is a first filter, the fluid pathway is a first fluid pathway, the first ring includes a first plurality of openings including the first opening, and the second ring includes a second plurality of openings including the second opening, the separator further including a plurality of filters including the first filter, each of the plurality of filters disposed in a corresponding fluid pathway defined by a first one of the first plurality of openings and a second one of the second plurality of openings.

3. The separator of claim 2, wherein the plurality of filters has an even quantity and the plurality of filters are distributed evenly about a centerline axis of the first ring.

4. The separator of claim 1, further including a first piston seal disposed on an external surface of the second ring.

5. The separator of claim 4, further including a second piston seal, the second opening disposed between the first piston seal and the second piston seal.

6. The separator of claim 1, wherein each of the plurality of interior sections is fluidly sealed from other ones of the plurality of interior sections.

7. The separator of claim 1, wherein the second ring further includes a mount disposed within the interior, the mount including the filter disposed therein, the mount including:
   a third opening on a first side of the filter; and
   a fourth opening on a second side of the filter, the second side opposite the first side, the filter disposed between the third opening and the fourth opening.

8. The separator of claim 7, wherein the third opening and the fourth opening are arranged such that the fluid pathway extends circumferentially though the filter.

9. The separator of claim 7, wherein the filter includes:
   a first separation medium abutting the third opening; and
   a second separation medium abutting the fourth opening, the second separation medium denser than the first separation medium.

10. The separator of claim 9, wherein the third opening is radially outward of the fourth opening.

11. A gas turbine engine comprising:
   a shaft configured to rotate during operation of the gas turbine engine, the shaft disposed within a cavity containing a first fluid and a second fluid, the second fluid having a different density than the first fluid, wherein the first fluid is oil and the second fluid is air; and
   a separator coupled to the shaft, the separator including:
      a first ring including a first opening, the first opening receiving the first fluid and the second fluid from the cavity;
      a second ring surrounding the first ring; and
      a filter disposed between the first ring and the second ring, a rotation of the separator causing the first fluid and the second fluid to flow through a fluid pathway including the filter, the fluid pathway separating the first fluid from the second fluid.

12. The gas turbine engine of claim 11, wherein the second ring includes a second opening downstream on the fluid pathway from the filter, second opening to expel the second fluid from the separator.

13. The gas turbine engine of claim 12, further including:
   a first piston seal disposed on an external surface of the second ring; and
   a second piston seal disposed on the external surface, the first piston seal on an opposite side of the second opening as the first piston seal.

14. The gas turbine engine of claim 11, wherein the second ring includes:
   a first surface; and
   a second surface disposed radially outward of the first surface, the first surface and the second surface defining an interior; and a plurality of fluidly sealed walls disposed within the interior, the plurality of fluidly sealed walls dividing the interior into a plurality of interior sections.

15. The gas turbine engine of claim 14, wherein each of the plurality of interior sections includes a corresponding one of a plurality of filters, the plurality of filters including the filter.

16. The gas turbine engine of claim 11, wherein the separator is disposed within an oil seal diameter of a sump.

17. The gas turbine engine of claim 11, wherein the filter includes a plurality of separation mediums disposed sequentially along the fluid pathway, the separation mediums having different permeabilities.

18. A gas turbine engine comprising:
a shaft configured to rotate during operation of the gas turbine engine, the shaft disposed within a cavity containing a first fluid and a second fluid, the second fluid having a different density than the first fluid, wherein the shaft is associated with a supercritical carbon dioxide pump, the first fluid is liquid supercritical carbon dioxide, and the second fluid is gaseous supercritical carbon dioxide; and
a separator coupled to the shaft, the separator including:
a first ring including a first opening, the first opening receiving the first fluid and the second fluid from the cavity;
a second ring surrounding the first ring; and
a filter disposed between the first ring and the second ring, a rotation of the separator causing the first fluid and the second fluid to flow through a fluid pathway including the filter, the fluid pathway separating the first fluid from the second fluid.

19. The gas turbine engine of claim 18, wherein the second ring includes:
a first surface; and
a second surface disposed radially outward of the first surface, the first surface and the second surface defining an interior; and
a plurality of fluidly sealed walls disposed within the interior, the plurality of fluidly sealed walls dividing the interior into a plurality of interior sections.

20. The gas turbine engine of claim 18, further including a piston seal disposed on an external surface of the second ring.

* * * * *